US007412078B2

(12) United States Patent
Kim

(10) Patent No.: US 7,412,078 B2
(45) Date of Patent: Aug. 12, 2008

(54) SYSTEM FOR AUTOMATIC RECOGNIZING LICENSE NUMBER OF OTHER VEHICLES ON OBSERVATION VEHICLES AND METHOD THEREOF

(75) Inventor: Sung Ho Kim, Seoul (KR)

(73) Assignee: Hyunjae Tech Co., Ltd., Seoul (KR)

( * ) Notice: Subject to any disclaimer, the term of this patent is extended or adjusted under 35 U.S.C. 154(b) by 935 days.

(21) Appl. No.: 10/482,959

(22) PCT Filed: Jul. 18, 2002

(86) PCT No.: PCT/KR02/01347

§ 371 (c)(1),
(2), (4) Date: Jan. 8, 2004

(87) PCT Pub. No.: WO03/009251

PCT Pub. Date: Jan. 30, 2003

(65) Prior Publication Data

US 2004/0218785 A1 Nov. 4, 2004

(30) Foreign Application Priority Data

Jul. 18, 2001 (KR) ........................... 2001-0043189
Jul. 11, 2002 (KR) ........................... 2002-0040485

(51) Int. Cl.
*G06K 9/00* (2006.01)

(52) U.S. Cl. ........................................ 382/105

(58) Field of Classification Search ................. 382/100, 382/105
See application file for complete search history.

(56) References Cited

U.S. PATENT DOCUMENTS 5,425,108 A * 6/1995 Hwang et al. ............... 382/105
5,568,406 A * 10/1996 Gerber ....................... 702/159

FOREIGN PATENT DOCUMENTS

DE 19537940 A1 4/1997
GB 2248994 A 4/1992
KR 2001-0044778 6/2001

OTHER PUBLICATIONS

Abstract of Korean Publication No. P 2001-0044778 Dated Jun. 5, 2001.
Abstract of Germany Publication No. 19537940 Dated Apr. 17, 1997.

* cited by examiner

*Primary Examiner*—Matthew C. Bella
*Assistant Examiner*—Wesley Tucker
(74) *Attorney, Agent, or Firm*—Ladas and Parry LLP

(57) ABSTRACT

The present invention relates to a system and method for automatically recognizing a license plate number of a subject vehicle in use of a surveillance vehicle, which mounts automatic license plate number recognition equipment including a camera to a vehicle such as police patrol car, security company car, taxi, and so on, recognizes the license plate of a different vehicle on the run or in parking or stopping through the camera, verifying whether the vehicle is stolen, in search, or has a forged license plate, and can deal with the vehicle early when the vehicle is in question.

22 Claims, 14 Drawing Sheets

SYSTEM FOR AUTOMATIC RECOGNIZING LICENSE NUMBER OF OTHER VEHICLES ON OBSERVATION VEHICLES AND METHOD THEREOF

TECHNICAL FIELD

The present invention relates to vehicle recognition system and method.

More particularly, the present invention relates to system and method for automatically recognizing license plate numbers of subject vehicles using a surveillance vehicle, which can recognize a license plate number of a subject vehicle on the run or in parking or stopping in use of a camera installed in the surveillance vehicle, detect whether the vehicle is one stolen, in search, or having a forged license plate, and take early actions on a vehicle in question.

BACKGROUND ART

A conventional vehicle recognition (vehicle surveillance) could be performed through a monitoring camera installed on main roads, as we know, or a policeman or a guard could ascertain the vehicle recognition in a wireless manner after verifying a vehicle number, vehicle color, or the like by his eyes.

However, identifying a vehicle in such a manner has a problem in that there is no way but inevitably recognizing a limitation of a certain extent. That is, monitoring cameras installed on main roads have a problem in that many of them are revealed since they are fixed at their positions, and also have a problem in that lots of time is required, even though a monitoring camera catches a vehicle in question at a position, to bring the vehicle under arrest through the catching of the camera and a distance exists between arrest personnel and the vehicle in question.

Further, the case that personnel such as road police, supervision personnel, and the like do a direct surveillance has a problem since it is basically impossible to do an incessant surveillance and it is difficult to do a perfect surveillance during the surveillance.

Furthermore, there exists a problem since it is hard to grasp whether, upon instantly discovering a vehicle, it is hard to grasp whether the vehicle is one in question and, even though a vehicle in question is discovered, a practical use is not easy since it is difficult to make evidence documents.

DISCLOSURE OF THE INVENTION

In order to solve the above problems, it is an object of the present invention to system and method for automatically recognizing license plate numbers of subject vehicles in use of a surveillance vehicle, which can acquire information on a subject vehicle on the run or in parking or stopping from a surveillance vehicle equipped with a camera, grasp whether the subject vehicle is in question through a database, and take early actions on a subject vehicle in question.

In order to achieve the above object, a system according to the present invention comprises the surveillance vehicle having a camera for photographing license plate information of the subject vehicle on the run or in parking or stopping, a surveillance part for extracting a license plate number of the subject vehicle based on data photographed through the camera, receiving result data on whether the subject vehicle is one in question from a server computer-verifying whether the subject vehicle has a problem based on the extracted license plate number of the subject vehicle for notifications to a driver or a passenger in characters or by voice, and a portable communication device for transferring the license plate number of the subject vehicle extracted from the surveillance part through a communication network; and the server computer for periodically receiving information on vehicles in various questions such as theft or search from computers of processing institutions such as police, junked vehicle management agencies, district offices, and so on, which control and manage vehicles through the communication network for building a database, and, if the license plate number of the subject vehicle is received from the portable communication device equipped in the surveillance vehicle via the communication network, comparing the license plate number of the subject vehicle with the vehicle information stored in the database for identifications on whether the subject vehicle is in question, and transferring result data on whether the subject vehicle has a problem to the portable communication device equipped in a corresponding surveillance vehicle.

Further, another system according to the present invention comprises the surveillance vehicle having a camera for photographing license plate information of the subject vehicle on the run or in parking or stopping, a surveillance part for extracting the license plate number of the subject vehicle based on data photographed via the camera, comparing the extracted license plate number of the subject vehicle with information on vehicles in question which is stored in a database for verifications on whether the subject vehicle is in question, notifying a driver or a passenger in characters or by voice of result data on whether the subject vehicle is in question, and recording discovery of a vehicle in question if impossible to notify a server computer of notification of a result on whether the subject vehicle is in question, and a portable communication device for receiving information on vehicles in question which is periodically updated from the server computer and transferring to the server computer through the communication network information on the subject vehicle verified as a vehicle in question if possible to notify the server computer of a result as to whether the subject vehicle is in question; and the server computer for periodically receiving information on vehicles in various questions such as theft and/or search from computers of processing institutions such as police, junked vehicle management agencies, district offices, and so on, which control and manage vehicles through the communication network for building a database, transferring the information on vehicles in question which is periodically updated to the portable communication device equipped in each surveillance vehicle through the communication network, and storing in the database the information on the subject vehicle verified as a vehicle in question which is received from the portable communication device equipped in the surveillance vehicle through the communication network.

Further, yet another system according to the present invention comprises the surveillance vehicle including a camera for photographing license plate information of the subject vehicle on the run or in parking or stopping, a surveillance part for extracting the license plate number based on photographing data of the subject vehicle, and notifying a driver or a passenger in characters or by voice of result data on whether the subject vehicle is in question which is received through a portable communication device from a server computer verifying whether the subject vehicle is one in question based on the extracted license plate number, and the portable communication device for transferring the photographing data of the camera through a communication network to the server computer; and the server computer for building a database for the information on vehicles in various questions such as theft and search which is periodically provided from computers of processing institutions such as police, junked vehicle management agencies, district offices, and so on, which control and manage vehicles through the communication network, extracting the license plate number of the subject vehicle based on the photographing data received from the surveillance vehicle through the communication network, verifying whether the subject vehicle is in question in comparison of the extracted license plate number of the subject vehicle with the information on vehicles in question which is stored in the database, and transferring result data as to whether the subject vehicle is in question to the portable communication device equipped in the surveillance vehicle for a surveillance vehicle driver's or a passenger's verifications Further, a method according to the present invention comprises steps of (1) recognizing the subject vehicle on the run or in parking or stopping which is located in a photographing range of a camera mounted to the surveillance vehicle, and photographing the subject vehicle inclusive of its license plate through the camera; (2) extracting the license plate number of the subject vehicle based on photographing data of the subject vehicle photographed by the camera; (3) transferring through a portable communication device to a server computer the license plate number of the subject vehicle which is extracted in the surveillance part equipped in the surveillance vehicle; (4) inputting, if the server computer receives the license plate number of the subject vehicle from the surveillance vehicle, up-to-date information on vehicles in question from related processing institution computers based on whether a database provided for grasping whether the subject vehicle is in question is valid, and updating the database; (5) verifying by the server computer whether the subject vehicle has a problem in comparison with the information on vehicles in question stored in the database based on the license plate number of the subject vehicle which is received from the surveillance vehicle; (6) notifying, by the server computer, the surveillance vehicle that the subject vehicle is not one in question, if it is verified that the subject vehicle is not one in question; (7) determining, by the server computer, whether the surveillance vehicle can deal with the subject vehicle if it is verified that the subject vehicle is one in question; (8) notifying, by the server computer, the surveillance vehicle that the subject vehicle is one in question to deal with the subject vehicle in question, if the surveillance vehicle can deal with the subject vehicle in question; and (9) notifying, by the server computer, a related processing institution computer of the information on the subject vehicle to deal with the subject vehicle, if the surveillance vehicle can not deal with the subject vehicle in question.

Further, another method according to the present invention comprises steps of: (A) recognizing the subject vehicle on the run or in parking or stopping which is located within a photographing range of a camera mounted to the surveillance vehicle, and photographing the subject vehicle inclusive of a license plate thereof through the camera; (B) extracting a license plate number of the subject vehicle based on photographing data of the subject vehicle photographed by the camera; (C) receiving up-to-date information on vehicles in question which is provided to a related processing institution computer from a server computer, after the extraction of the license plate number of the subject vehicle, according to whether a database provided for grasping whether the subject vehicle is in question is valid, and updating the database; (D) comparing the information on vehicles in question which is stored in the database based on the license plate number of the subject vehicle extracted from a surveillance part equipped in a surveillance vehicle and verifying whether the subject vehicle has a problem; (E) outputting characters or a voice, if the subject vehicle is not one in question, notifying from the surveillance part equipped in the surveillance vehicle that the subject vehicle is not one in question for driver's or passenger's identifications; (F) determining whether the surveillance part equipped in the surveillance vehicle can deal with the subject vehicle if the subject vehicle is one in question; (G) outputting characters or a voice, if the surveillance vehicle can deal with the subject vehicle in question, notifying from the surveillance part equipped in the surveillance vehicle that the subject vehicle is one in question to enable a driver or a passenger to deal with the subject vehicle in question; and (H) notifying the related processing institution computer from the surveillance part equipped in the surveillance vehicle of information on the subject vehicle through a portable communication device, if the surveillance vehicle can not deal with the subject vehicle in question, to enable dealing with the subject vehicle in question.

Further, yet another method according to the present invention comprises steps of (a) recognizing the subject vehicle on the run or in parking or stopping which is located within a photographing range of a camera mounted to the surveillance vehicle, and photographing the subject vehicle inclusive of a license plate thereof through the camera; (b) transferring through the communication network to a server computer photographing data of the subject vehicle photographed by the camera; (c) extracting a license plate number of the subject vehicle based on the photographing data if the server computer receives the photographing data of the subject vehicle from the surveillance vehicle; (d) receiving, by the server computer, up-to-date information on vehicles in question from a related processing institution computer according to whether a database provided for grasping whether the subject vehicle is in question is valid, and updating the database; (e) comparing, by the server computer, the information on vehicles in question which is stored in the database based on the license plate number of the subject vehicle and verifying whether the subject vehicle has a problem; (f) notifying, by the server computer, the surveillance vehicle that the subject vehicle is not one in question, if the subject vehicle is not one in question; (g) determining, by the server computer, whether the surveillance vehicle can deal with the subject vehicle if the subject vehicle is one in question; (h) notifying, by the server computer, the surveillance vehicle that the subject vehicle is one in question, to enable the dealing with the subject vehicle in question, if the surveillance vehicle can deal with the subject vehicle in question; and (i) notifying, by the server computer, the related processing institution computer of information on the subject vehicle, if the surveillance vehicle can not deal with the subject vehicle in question, to enable the dealing with the subject vehicle in question.

At this time, the above step (a) can be replaced with a step of photographing license plate information of the subject vehicle on the run or in parking or stopping by a driver, a passenger, or a movable (portable) camera bearer of the surveillance vehicle who uses a movable (portable) camera, and downloading to a surveillance part photographing data of the subject vehicle after a connection of the movable (portable) camera to the surveillance part.

BRIEF DESCRIPTION OF THE DRAWINGS

The above object and other features of the present invention will become more apparent by describing in detail a preferred embodiment thereof with reference to the attached drawings, in which.

BEST EMBODIMENTS OF THE INVENTION

Hereinafter, each embodiment of the present invention will be described in detail with reference to the accompanying drawings.

Embodiment 1

Figure 1:
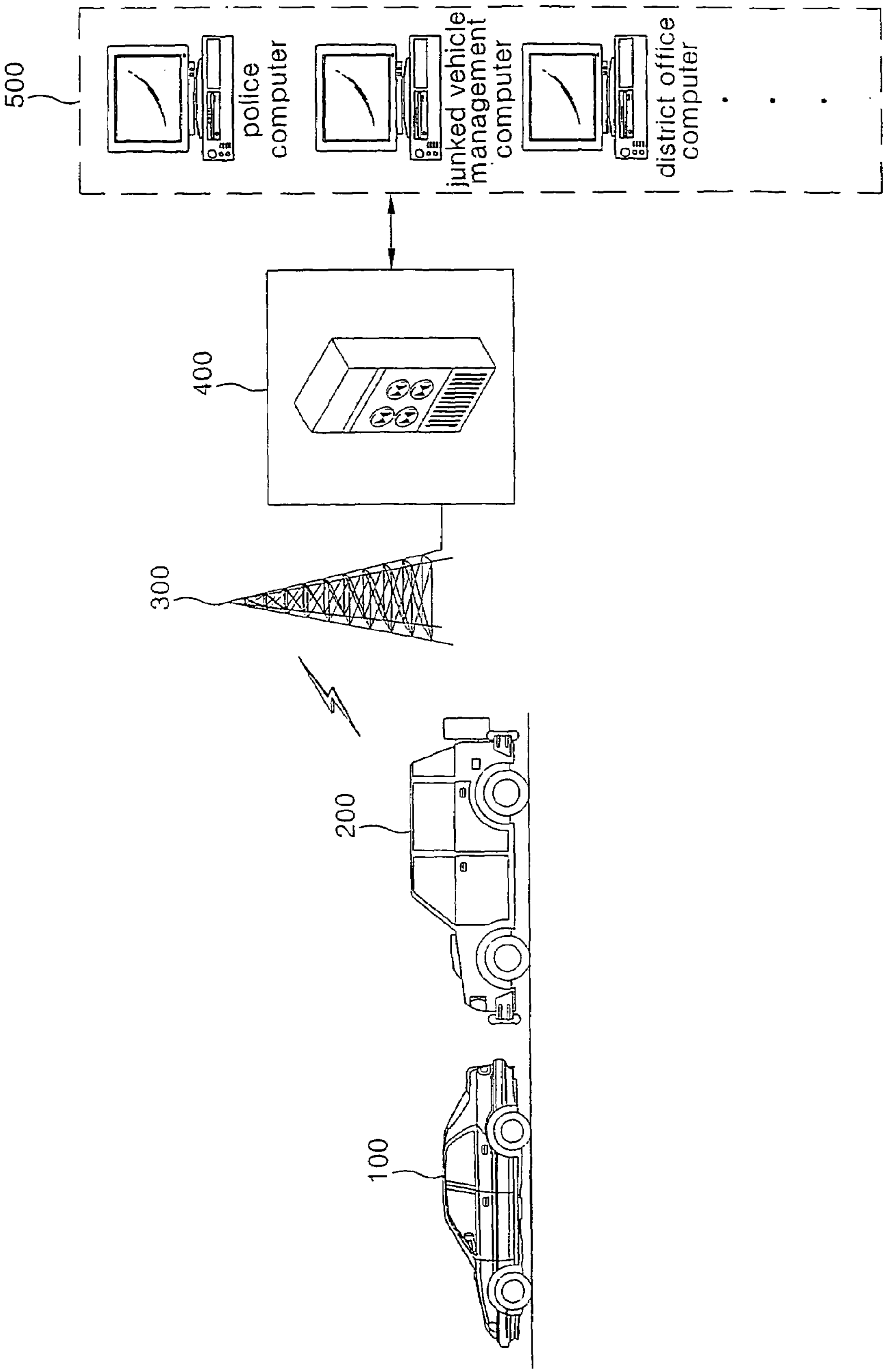
FIG. 1 is a view for showing a structure of a system for automatically recognizing a license plate number of a subject vehicle in use of a surveillance vehicle according to each embodiment of the present invention.

FIG. 1 is a view for showing a structure of a system for automatically recognizing a license plate number of a subject vehicle in use of a surveillance vehicle according to the present invention.

As shown in FIG. 1, the system for automatically recognizing a license plate number of a vehicle according to the present invention comprises a subject vehicle 100, a surveillance vehicle 200 equipped with a device for automatically recognizing a license plate number of a vehicle, a communication network 300 for transferring information, a server computer 400 for managing, storing data related is to an automatic license plate number recognition and performing data communications with the surveillance vehicle 200, and computers 500 of processing institutions such as police, junked vehicle management agencies, district offices, for controlling and managing vehicles.

The surveillance vehicle 200 has a camera 210 for photographing the subject vehicle 100 on the run or in parking or stopping inclusive of information on its license plate, a surveillance part 220 for extracting a license plate number of the subject vehicle 100 based on the data photographed through the camera 210, receiving result data on whether the subject vehicle is in question form the server computer 400 which verifies whether the subject vehicle is in question based the extracted license plate number of the subject vehicle, and a portable communication device 230 for transferring through the communication network 300 to the server computer 400 the extracted license plate number of the subject vehicle 100 from the surveillance part 220.

At this time, for the surveillance vehicle 200, police patrol cars, security company cars, taxis, and so on, on operation are used.

Further, two methods as follows can be used when the camera 210 mounted in the surveillance vehicle 200 photographs a license number plate of the subject vehicle 100.

First, a camera photograph method based on automatic sensing is used. That is, it uses a method that a sensor (not shown) attached to the camera 210 or located in a different place from the surveillance vehicle 200 senses and photographs a subject vehicle (or a license plate number).

Second, a photographing method by a driver or a passenger of the surveillance vehicle 200 is used. That is, it uses a method that a driver or a passenger in the surveillance vehicle 200 discovers the subject vehicle 100, presses a photographing switch, and gets the camera 100 receiving the photographing switch operation to photograph the subject vehicle 100.

The server computer 400 is periodically provided with information on vehicles in various questions such as in theft or in search from the computers 500 of the processing institutions such as police, junked vehicle management agencies, district offices, and so on, through the communication network 300 for building a database, if a license plate number of the subject vehicle 100 is received from the portable communication device 230 equipped in the particular surveillance vehicle 200 through the communication network 300, compares the vehicle information stored in the database with the license plate number of the subject vehicle 100 for verifying whether the subject vehicle 100 is in question (that is, theft, search, or forged license plate, and the like), and transfers result data on whether the subject vehicle 100 is in question to the portable communication device 230 (for example, Trunked Radio System (TRS) terminal, Personal Digital Assistant (PDA), or the like) equipped in the surveillance vehicle 200.

At this time, the above server computer 400 determines whether processing can be done in the surveillance vehicle 200 if the subject vehicle 100 is verified as one in question upon verifying whether in question with the comparison of the information on vehicles in various questions such as thief, search, and so on, stored in the database based on the license plate number of the subject vehicle 100 received from the portable communication device 230 equipped in the particular surveillance vehicle 200, and transfers the information (the license plate number of the subject vehicle, present position, and the like) on the subject vehicle 100 verified as one in question by the computers 500 of the processing institutions such as police, junked vehicle agencies, district offices if it is impossible to process the subject vehicle 100 verified in question by the surveillance vehicle 200.

Figure 2:
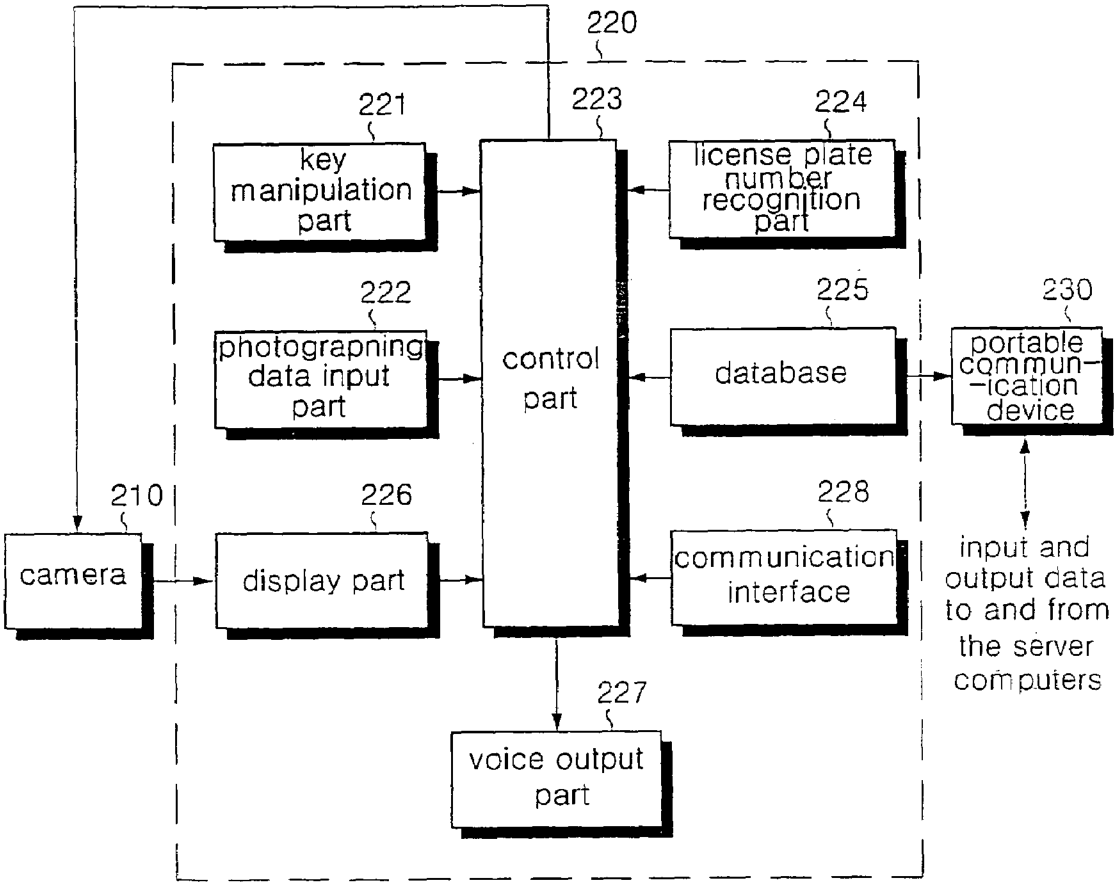
FIG. 2 is a view for showing a method for automatically recognizing a license plate number of a subject vehicle in use of a surveillance vehicle according to a first embodiment of the present invention.

FIG. 2 is a view for showing in detail an internal structure of the surveillance vehicle 200 of FIG. 1 according to the first embodiment of the present invention.

As shown in FIG. 2, a key manipulation part 221 inputs, for a recognition of a license plate number of the subject vehicle 100, a key manipulation signal of a driver or a passenger of the surveillance vehicle 200 for an output to a control part 223.

A photographing data input part 222 inputs photographing data of the subject vehicle 100 photographed through the camera 210 for an output to the control part 223.

The control part 223 outputs to a license plate number recognition part 224 the photographing data of the subject vehicle 100 inputted through the photographing data input part 222, controls an extraction of the license plate number of the subject vehicle 100, controls an transfer of the license plate number of the subject vehicle 100 extracted from the license plate number recognition part 224 to the server computer 400 through the portable communication device 230, and controls character and voice outputs to enable a driver or a passenger to verify result data on whether the subject vehicle 100 received from the server computer 400 which verifies whether the subject vehicle 100 is in question based on its license plate number is one in question.

The license plate number recognition part 224 extracts a license plate number of a subject vehicle based on the photographing data of the subject vehicle 100 inputted through the photographing data input part 222 according to the controls of the control part 223.

A database 225 stores various programs necessary for operations of the surveillance part 220, and an automatic license plate number recognition program for extracting a license plate number of the subject vehicle 100 based on the photographing data of the subject vehicle 100 photographed by the camera 210.

A display part 226 displays, for driver's or passenger's verifications, on a screen result data on whether the subject vehicle 100 received from the server computer 400 through the portable communication device 230 according to the controls of the control part 223 is in question.

A voice output part 227 converts into a voice result data on whether the subject vehicle 100 received from the server computer 400 through the portable communication device 230 according to the controls of the control part 223 is in question, and outputs the voice though speakers for driver's or passenger's verifications.

A communication interface 228 is connected for communications with the portable communication device 230 equipped in the surveillance vehicle 200, outputs to the portable communication device 230 a license plate number of the subject vehicle 100 according to the controls of the control part 223, and outputs to the control part 223 result data on whether the subject vehicle 100 inputted from the server computer 400 through the portable communication device 230 is in question.

Figure 3:
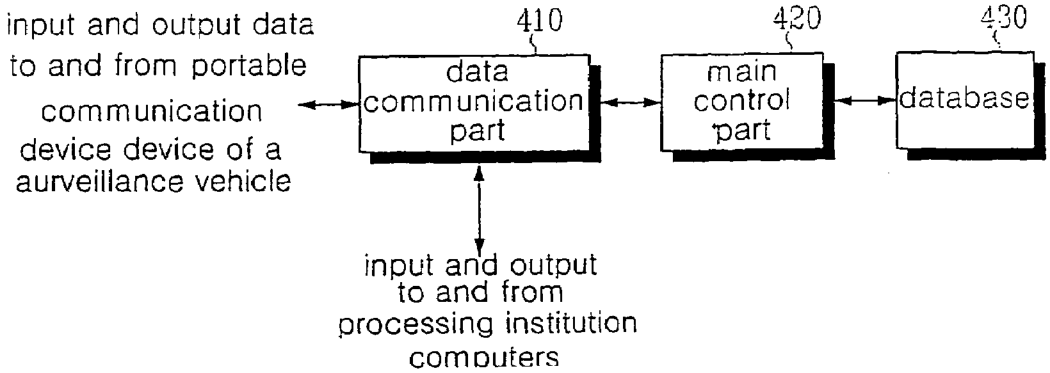
FIG. 3 is a view for showing in detail a structure of the server computer of FIG. 1 according to the first embodiment of the present invention.

FIG. 3 is a view for showing in detail a structure of the server computer 400 of FIG. 1 according to the first embodiment of the present invention.

As shown in FIG. 1, a data communication part 410 periodically inputs, for an output to a main control part 420, information on vehicles in various questions such as theft, search, and so on, from the computers 500 of the processing institutions such as police, junked vehicle management agencies, district offices, and the like, through the communication network 300, receives, for an output to the main control part 420, a license plate number of the subject vehicle 100 from the portable communication device 230 equipped in the surveillance vehicle 200 through the communication network 300, and transfers to the portable communication device 230 equipped in the surveillance vehicle 200 result data on whether the subject vehicle 100 inputted from the main control part 420 is in question.

The main control part 420 controls, for storage to the database 430, information on vehicles in various questions such as theft, search, and so on, inputted from the computers 500 of the processing institutions such as police, junked vehicle management agencies, district offices, and the like, through the data communication part 410, compares the vehicle information stored in the database with a license plate number of the subject vehicle 100 based on the license plate number of the subject vehicle 100 received from the portable communication device 230 equipped in the surveillance vehicle 200 through the data communication part 410 and verifies whether the subject vehicle 100 is in question, and controls a transfer of result data on whether the subject vehicle 100 is in question to the portable communication device 230 equipped in the surveillance vehicle 200.

The database 430 updates and stores information on vehicles in various questions such as theft, search, and so on, inputted from the processing institution computers 500 according to the main control part 420.

Next, a method for automatically recognizing a license plate number of a subject vehicle in use of a surveillance vehicle will be described in detail according to the first embodiment of the present invention constructed as above with reference to FIG. 4 to FIG. 8.

Figure 4A:
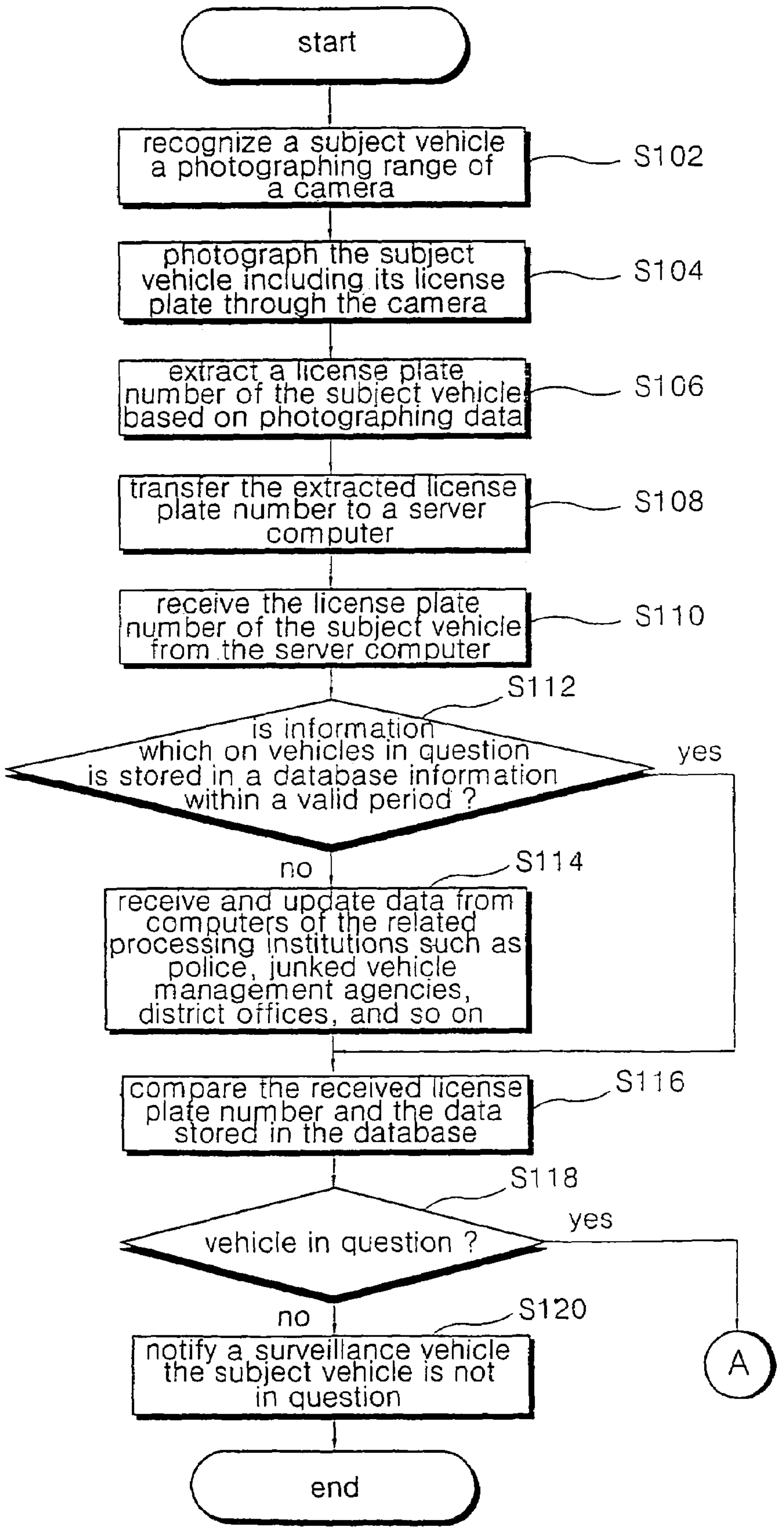
FIG. 4 is a flow chart for the method for automatically recognizing a license plate number of a subject vehicle in use of a surveillance vehicle according to the first embodiment of the present invention.
Figure 4B:
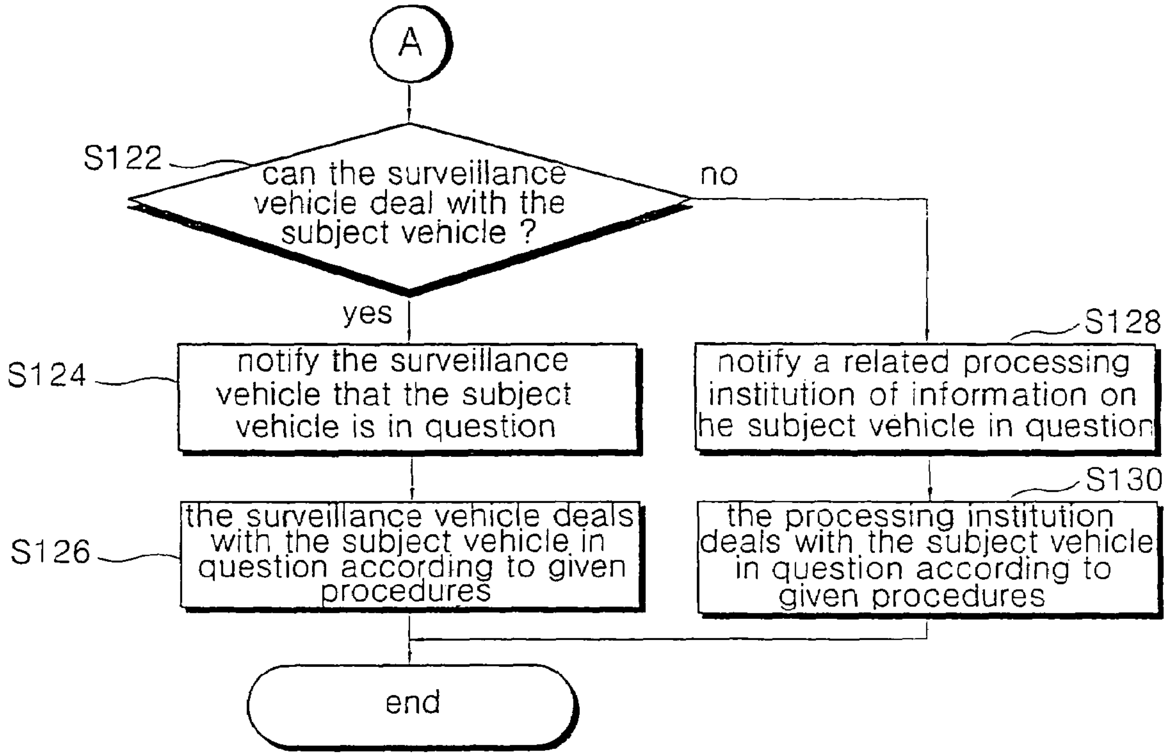
Figure 5:
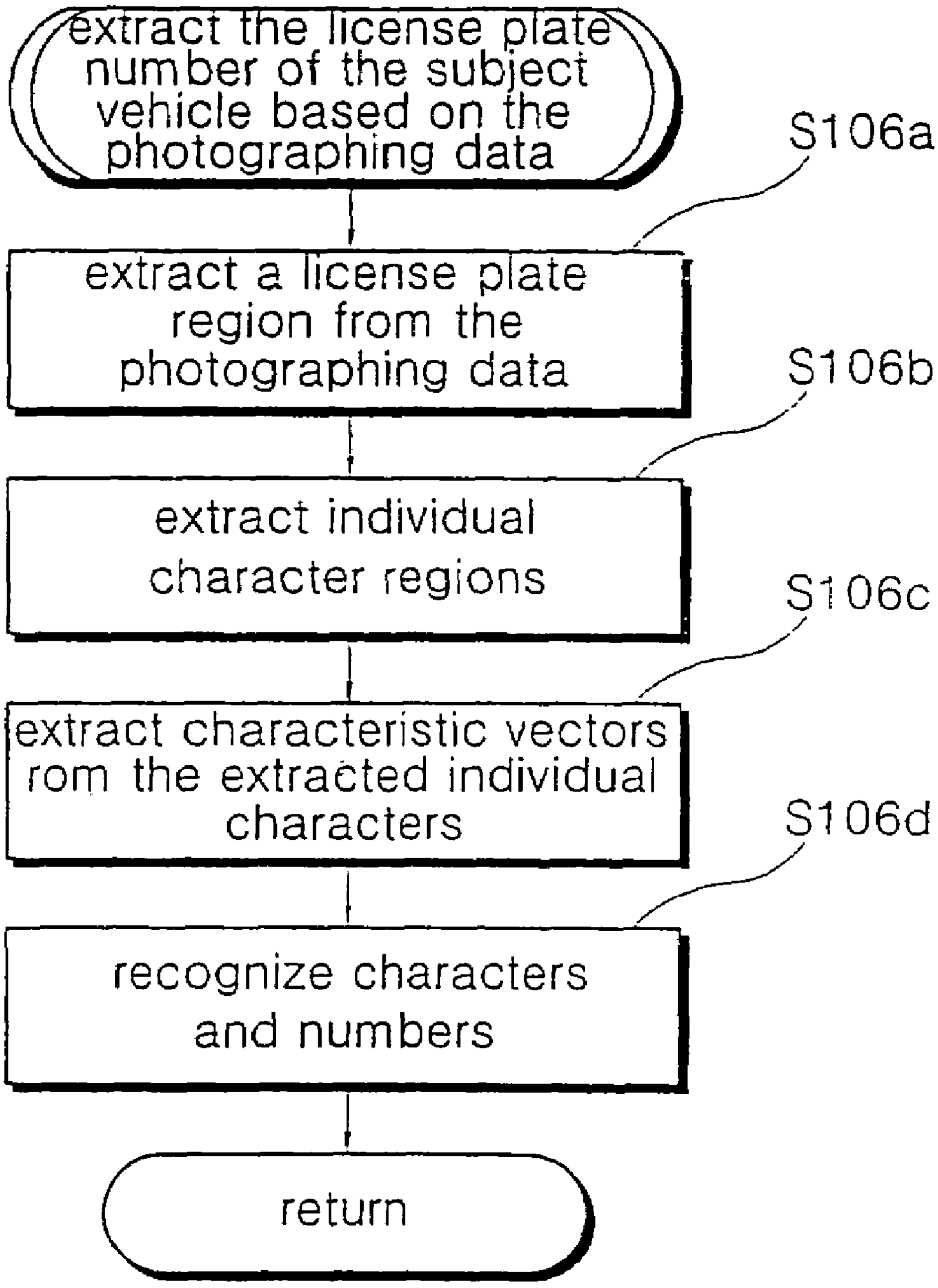
FIG. 5 to FIG. 8 are flow charts for showing in more detail routines for automatically recognizing a license plate number of a subject vehicle in FIG. 4.

FIG. 4 is flow charts for a method for automatically recognizing a license plate number of a subject vehicle in use of a surveillance vehicle according to the first embodiment of the present invention, and FIG. 5 to FIG. 8 are flow charts for showing in more detail routines for automatically recognizing a license plate number of a subject vehicle of FIG. 4.

First, the first embodiment of the present invention extracts a license plate number of the subject vehicle 100 from the surveillance vehicle 200 for a transfer to the server computer 400, and, after verifying whether the subject vehicle 100 in question appears from the server computer 400 based on the extracted license plate number, notifies, for processing, the corresponding surveillance vehicle 200 or the related processing institution computers 500 of information on the subject vehicle 100 being in question according to whether the surveillance vehicle 200 can deal with, which recognizes the subject vehicle 100 on the run or in parking/stopping which is located within a photographing range from the particular surveillance vehicle 200 equipped with an automatic license plate number recognition device (camera, surveillance device, portable communication device, and so on)(S102), and photographs the subject vehicle 100 inclusive of its license plate number information through the camera 210 equipped in the surveillance vehicle 200 (S104).

At this time, the photographing of the subject vehicle 100 is done by the camera 210 after automatically recognizing the subject vehicle 100 by means of a surveillance sensor provided at a certain position of the surveillance vehicle 200 or the camera 210, or by a method that a driver or a passenger recognizes the subject vehicle 100 within a photographing range, manipulates the camera 210, and photographs the subject vehicle 100.

After acquiring photographing data inclusive of the information on the license plate number of the subject vehicle 100 through the camera 210, the control part 223 of the surveillance part 220 equipped in the surveillance vehicle 200 outputs to the license plate number recognition part 224 the photographing data inputted through the photographing data input part 222 for an extraction of the license plate number of the subject vehicle 100 (S106).

A license plate number extraction process of the subject vehicle 100 is described in more detail as below with reference to FIG. 5 to FIG. 8 of the is accompanying drawings.

First, the license plate number recognition part 224 extracts a license plate number region of the subject vehicle 100 based on the photographing data including the license plate number information of the subject vehicle 100 photographed by the camera 210 from the photographing data of the subject vehicle 100 inputted from the control part 223 (S106*a*).

Figure 6:
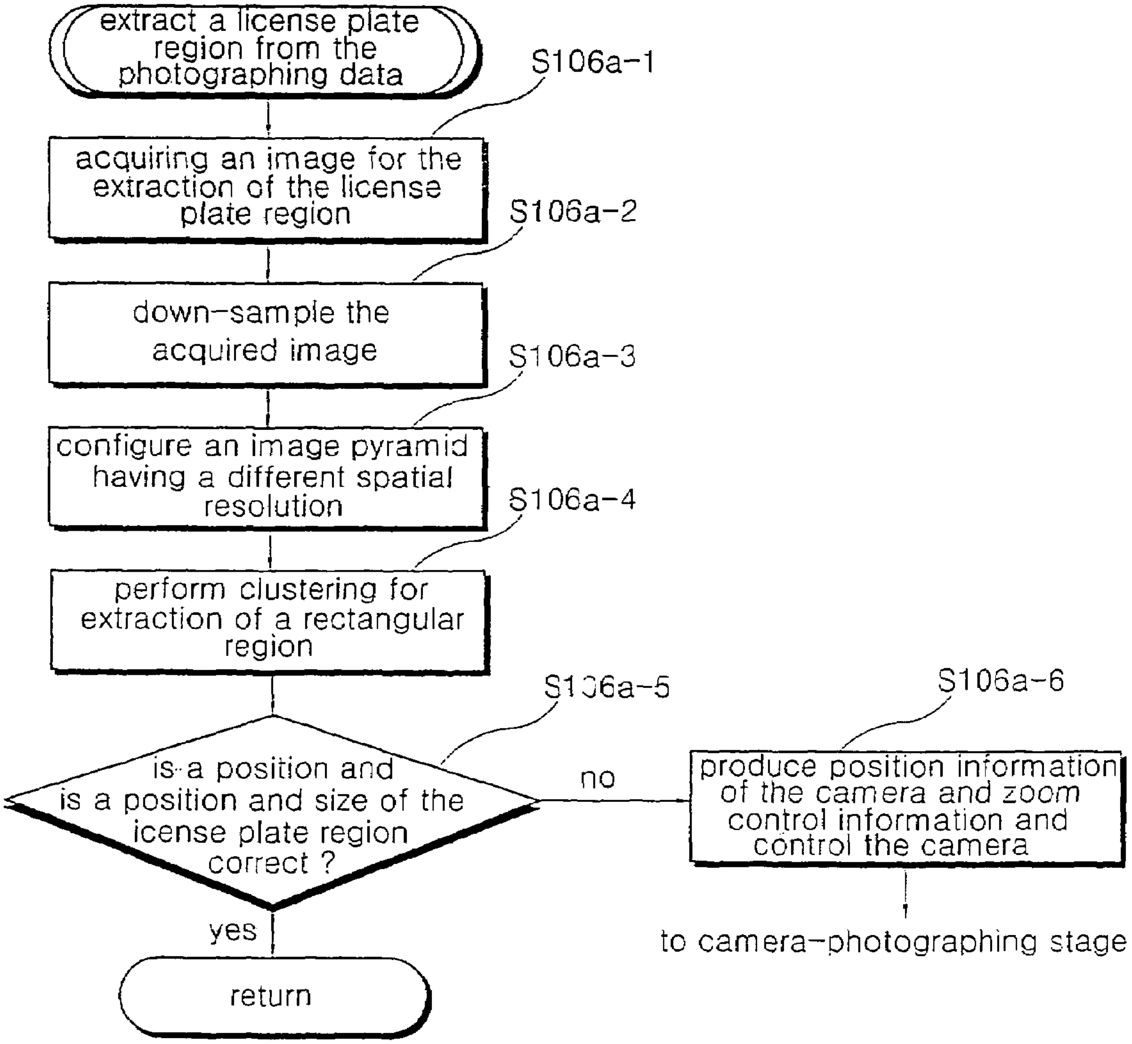

Described in detail with reference to FIG. 6, an image (for example, 640×480 resolution) is acquired to extract the license plate number region from the photographing data including the license plate number information of the subject vehicle 100 photographed by the camera 210 (S106*a*-1), an image quality deterioration due to camera movements is alleviated by performing a down sampling to lower a resolution of the image acquired from the step S106*a*-1(for example, 640×240 resolution)(S106*a*-2), the down-sampled image is configured to an image pyramid(for example, 640×240, 320×120, 160×60, and 80×30) having different spatial resolutions in order to select a resolution suitable for extracting a license plate region(S106*a*-3), the color level is converted to a gray level by using color information of the license plate after configuring the image pyramid having different spatial resolutions and converted into a binary image through a proper threshold value selection, and clustering is carried out to extract a rectangular region by producing a projection image in lengthwise and widthwise directions and using the lengthwise/widthwise projection image and an aspect ratio of the length and width of the license plate (S106*a*-4), a next step (S106*b*) proceeds with a decision on whether a position and a size of the license plate region in the clustering-performed image are correct (S106*a*-5), and, if the position and size of the license plate region in the clustering-performed image are not correct, the control part 223 of the surveillance part 220 equipped in the surveillance vehicle 220 controls the camera 100 by producing information on left, right, up, and down positions of the camera and a zoom control signal (S106*a*-6). That is, the step (S104)(step S204 in a second embodiment, and step S304 in a third embodiment) is carded out again for photographing the subject vehicle 100 through the camera 210 equipped in the surveillance vehicle 200.

After extracting the license plate region of the subject vehicle 100 through the step S106*a*, individual character regions are extracted from the extracted license plate region (S106*b*).

Figure 7:
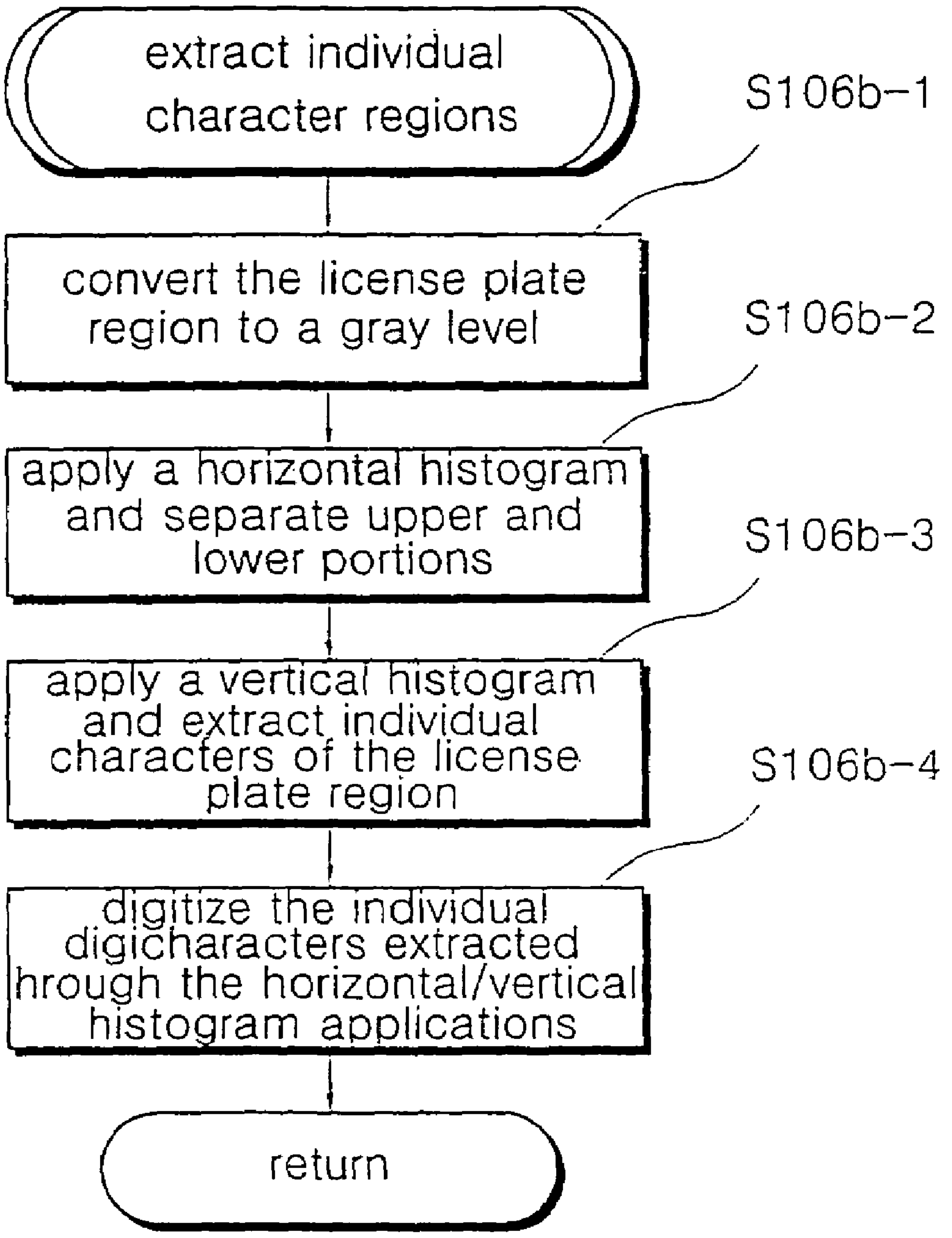

Describing in detail with reference to FIG. 7, the license plate number recognition part 224 converts the extracted license plate region into the gray level through the above step S106*a* (S106*b*-1), applies a horizontal histogram to the gray level-converted license plate region for a separation into an upper portion and a lower portion (S106-2), applies a vertical histogram to the license plate region separated into the upper and lower portions due to the application of the horizontal histogram for extractions of individual characters existing on the license plate region (S106*b*-3), and a next step (S106*c*) is carried out after digitizing through a proper threshold value selection the individual characters extracted through the horizontal/vertical histograms of the steps S106*b*-2 and S106*b*-3 (S106*b*-4).

Characteristic vectors are extracted from the respective individual character regions after extracting the individual character regions through the step S106*b* (S106*c*).

Figure 8:
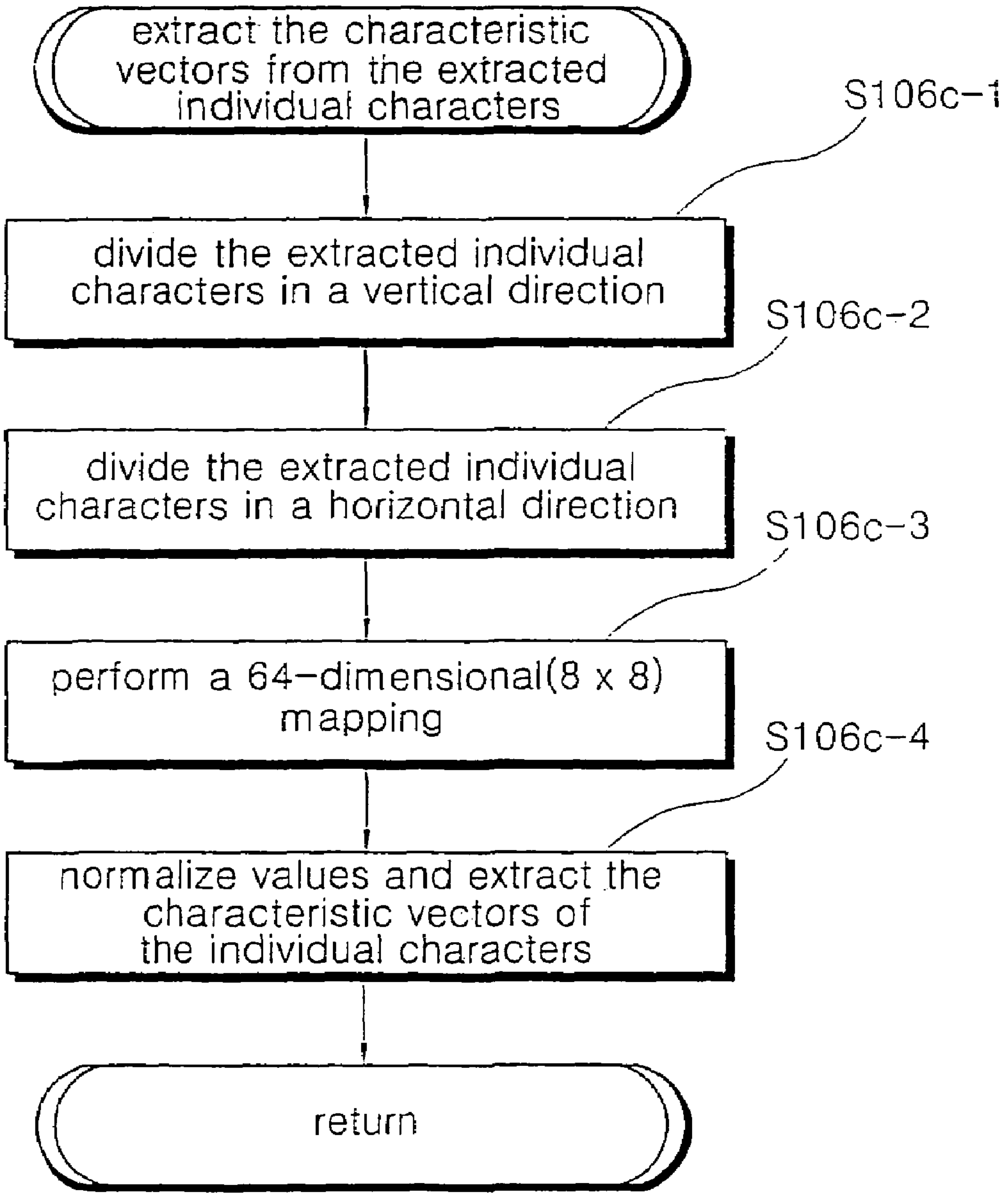

Describing in detail with respect to FIG. 8, the respective individual characters of the extracted license plate region through the step S106*b* are divided in the vertical direction (S106-1) and then in the horizontal direction (S106*c*-2), the respective individual characters of the license plate region are mapped to a 64-dimensional size (8×8) after divided in the horizontal/vertical directions (S106*c*-3), and, after the 64-dimensional (8×8) mapping, the values of the respective mapped individual characters are normalized for characteristic vector extractions (S106*c*-4). At this time, each mapped dimension has a value of 0 or 1, so it is not necessary to normalize a character size.

After the characteristic vector extractions from the individual character regions through the step S106*c*, characters and numbers are recognized from the extracted characteristic vectors and then a license plate number of the subject vehicle 100 are finally identified (S106*d*). At this time when characters and numbers are recognized based on the extracted characteristic vectors from the individual character regions, a character having the highest similarity from different characters recognized through a pattern learning in use of a modular neuro-network is selected as a license plate number of the subject vehicle 100.

Now, after extracting a license plate number of the subject vehicle 100 through the above step S106, the surveillance part 220 transfers the extracted license plate number of the subject vehicle 100 to the server computer 400 through the portable communication device 230 connected to the communication interface 228 (S108).

The server computer 400 receives the license plate number of the subject vehicle 100 from the surveillance vehicle 200 through the communication network 300 (S110).

The main control part of the server computer 400 determines whether information on vehicles in question stored in the database 430 is up-to-date information within a valid period (S112).

If the information on vehicles in question stored in the database 430 are not up-to-date information within a valid period as a result of the determination, the main control part 420 proceeds with a communication connection to the computers 500 of a related processing institution such as police, junked vehicle management agencies, district offices, and so on, through the data communication part 410, receives up-to-date information, and updates the database 430 (S114).

If the information on vehicles in question stored in the database 430 is up-to-date information within a valid period as a result of the determination of the above step S112 or after updating to up-to-date information through the above step S114, the main control part 420 compares the license plate number of the subject vehicle 100 received from the surveillance vehicle 200 with the information on vehicles in question stored in the database 430 (S116), and determines whether the subject vehicle 100 is one in question as a result of the comparison (S118).

If the subject vehicle 100 is not one in question as a result of the determination, the main control part 420 transfers to the surveillance vehicle 200 through the data communication part 410 a message notifying that the subject vehicle 100 is not one in question (S120).

At this time, in case that a driver or a passenger of the surveillance vehicle 200 is aware of having requested a vehicle inquiry to the server computer 400, the surveillance part 220 of the surveillance vehicle 200 notifies that the subject vehicle 100 has no problem through the display part 226 or the voice output part to is enable the driver or the passenger to verify it, and, in case that a driver or a passenger of the surveillance vehicle 200 is not aware of having requested a vehicle inquiry, the surveillance part 220 of the surveillance vehicle 200 records a receipt of a message that the subject vehicle 100 has no problem from the server computer 400.

However, if the subject vehicle 100 is one in question as a result of the determination of the above step S118, the main control part 420 determines whether the surveillance vehicle 200 can deal with the subject vehicle 100 (S122). That is, this is to check whether the surveillance vehicle 200 has a judicial processing capacity (for example, police vehicle).

If the surveillance vehicle 200 can directly deal with the subject vehicle 100 in question as a result of the determination, the main control part 420 transfers to the surveillance vehicle 200 a message notifying that the subject vehicle 100 is one in question (S124), and enables the surveillance vehicle

200 to deal with the subject vehicle 100 in question based on given processing procedures (S126).

However, as a result of the determination in the above step S122, if the surveillance vehicle 200 can not directly deal with the subject vehicle 100 in question since it has no judicial processing capacity, the main control part 420 notifies the computers 500 of the related processing institutions such as police and the like of the information of the subject vehicle 100 in question (S128), and enables a corresponding processing institution to deal with the subject vehicle 100 in question based on the information from the surveillance vehicle 200 (S130).

Lastly, the surveillance vehicle 200 or a vehicle of a related processing institution records photographing and processing results as to the particular subject vehicle 100, and, likewise, the server computer 400 records and manages inquiry and processing results of the subject vehicle 100 requested from the surveillance vehicle 200.

Embodiment 2

A basic structure of a system for automatically recognizing a license plate number according to a second embodiment of the present invention are the same as in reference numbers and names when compared with the structure of FIG. 1 described in the first embodiment before, but it has a difference in functions extracting a license plate number of the subject vehicle 100 from the surveillance vehicle 200, comparing the extracted license plate number with a database existing inside the surveillance vehicle 200, and directly verifying whether the subject vehicle 100 is one in question.

That is, the surveillance vehicle 200 includes a camera 210*a* for photographing license plate information of the subject vehicle 100 on the run or in parking or stopping, a surveillance part 220*a* for extracting a license plate number of the subject vehicle 100 based on data obtained from the photographing through the camera 210*a*, verifying whether the subject vehicle 100 has a problem in comparison of the extracted license plate number of the subject vehicle 100 with information on vehicles in question stored in a database, notifying a driver or a passenger in characters or by voice of result data on whether the subject vehicle 100 has a problem, and recording the discovery of a vehicle in question if impossible to notify the server computer 400 of a result on whether the subject vehicle 100 has a problem, and a portable communication device 230*a* for receiving information on vehicles in question which is periodically updated by the server computer 400, and transferring to the server computer 400 through the communication network 300 information on the subject vehicle 100 verified as a vehicle in question if possible to notify the server computer 400 of a result as to whether the subject vehicle 100 has a problem.

At this time, the surveillance part 220*a* equipped in the above surveillance vehicle 200, if the subject vehicle is verified as a vehicle in question when verifying whether a problem occurs in comparison with the information on vehicles in question such as theft, search, and so on, stored in the database based on the extracted license plate number of the subject vehicle 100, determines whether processing is possible in the surveillance vehicle 200, and, if the surveillance vehicle 200 can not deal with the subject vehicle 100 verified as a vehicle in question, transfers the information(license plate number of the subject vehicle, present location, and so on) on the subject vehicle 100 verified as a vehicle in question, for processing, to the computers 500 of the processing institutions such as police, junked vehicle management agencies, district offices, or the like, through the portable communication device 230*a* connected to the surveillance part 220*a* based on data stored in the database.

The server computer 400 is periodically provided through the communication network 300 with information on vehicles in various questions such as theft or search, for building a database, from the computers 500 of processing institutions such as police, junked vehicle management agencies, district offices, and so on, which control and manage vehicles, transfers the information on vehicles in question which is periodically updated to the portable communication device 230*a* equipped in each surveillance vehicle 200 through the communication network 300, and stores in the database the information on the subject vehicle 100 verified as a vehicle in question which is received from the portable communication device 230*a* equipped in the surveillance vehicle 200 through the communication network 300.

Figure 9:
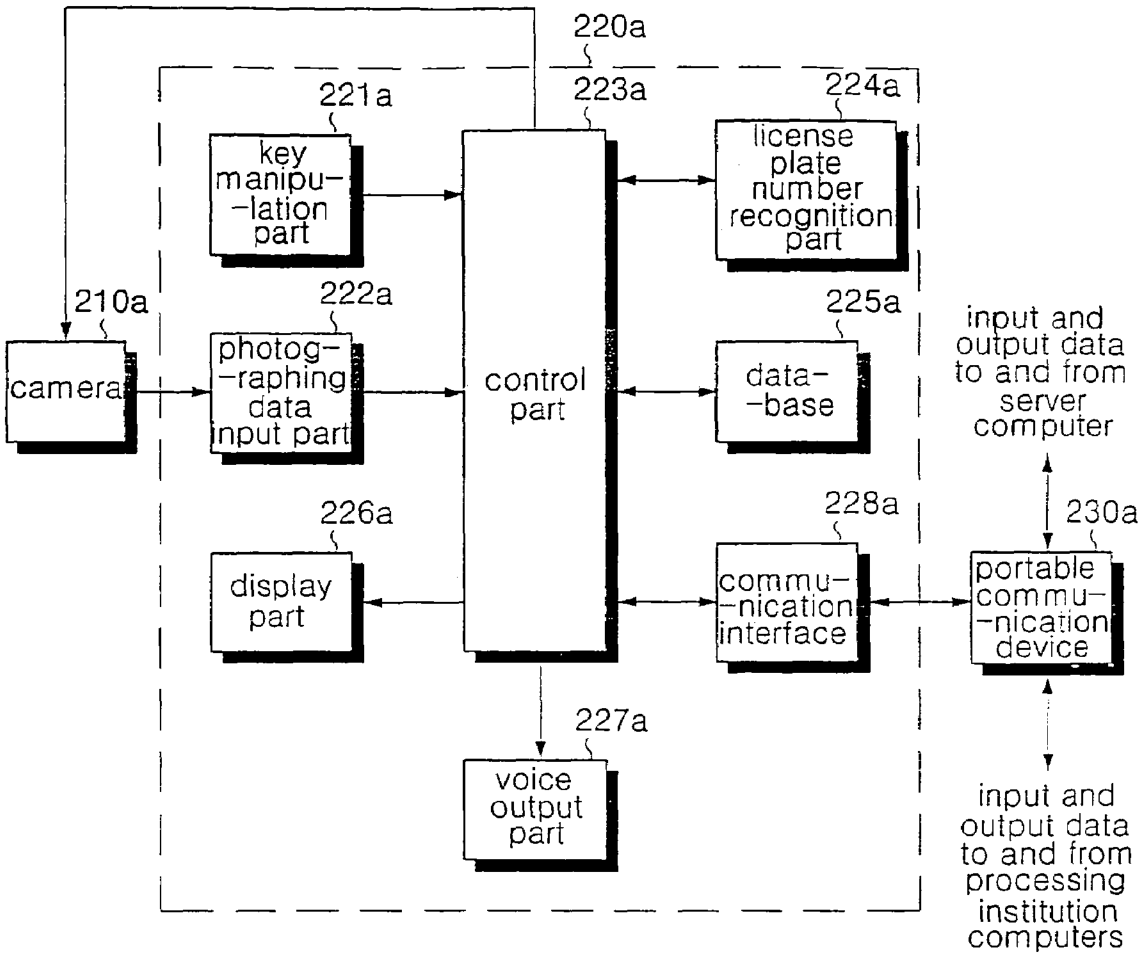
FIG. 9 and FIG. 10 are views for showing in more detail internal structures of a surveillance vehicle and a server computer according to a second embodiment of the present invention.

FIG. 9 is a view for showing in more detail the internal structure of the described surveillance vehicle 200 of FIG. 1 according to a second embodiment of the present invention.

As shown in FIG. 9, a key manipulation part 221*a* inputs, for a recognition of a license plate number of the subject vehicle 100, a key manipulation signal of a driver or a passenger of the surveillance vehicle 200 for an output to a control part 223*a*.

A photographing data input part 222*a* inputs photographing data of the subject vehicle 100 photographed through the camera 210*a* for an output to the control part 223*a*.

The control part 223*a* controls the storage of information on vehicles in various question such as theft and search which is periodically received from the server computer 400 into a database 225*a*, controls the extraction of a license plate number of the subject vehicle 100 from a license plate number recognition part 224*a* based on the photographing data of the subject vehicle 100 inputted through the photographing data input part 222*a*, verifies whether the subject vehicle 100 has a problem in comparison of a license plate number of the subject vehicle 100 extracted through the license plate number recognition part 224*a* with the information on vehicles in question stored in the database 225*a*, controls character and/or voice outputs to enable a driver or a passenger to verify result data on whether the subject vehicle 100 is one in question, and stores into the database 225*a* the discovery of a vehicle in question if impossible to notify the server computer 400 of a result on whether the subject vehicle 100 has a problem.

The license plate number recognition part 224*a* extracts a license plate number of a subject vehicle based on the photographing data of the subject vehicle 100 inputted through the photographing data input part 222*a* according to the controls of the control part 223*a*.

A database 225*a* stores various programs necessary for operations of the surveillance part 220*a*, and an automatic license plate number recognition program for extracting a license plate number of the subject vehicle 100 based on the photographing data of the subject vehicle 100 photographed by the camera 210*a*, updates and stores the information on vehicles in various questions such as theft and search which is periodically received from the server computer 400, and stores the discovery of a vehicle in question according to the controls of the control part 223*a*.

At this time, compact discs(CD) which are portable storage media may be used for the information on vehicles in various questions which is updated and managed in the above database 225*a*.

A display part 226*a* displays on a screen result data as to whether the subject vehicle 100 has a problem according to the controls of the control part 223*a* to enable a driver or a passenger to verify it.

A voice output part 227*a* converts into a voice result data on whether the subject vehicle 100 is one in question according to the controls of the control part 223*a*, and outputs the voice though speakers for driver's or passenger's verifications.

A communication interface 228*a* is connected, for communications, with the portable communication device 230*a* equipped in the surveillance vehicle 200, outputs to the control parts 223*a* the information on vehicles in various questions such as theft and/or search which is periodically received from the server computer 400 through the portable communication device 230*a*, and outputs to the portable communication device 230*a* the information on the subject vehicle 100 verified as a vehicle in question according to the controls of the control part 223*a*.

Figure 10:
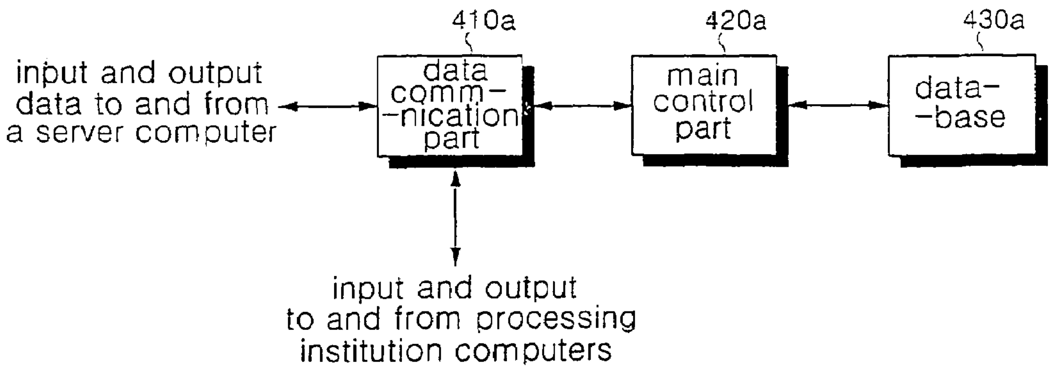

FIG. 10 is a view for showing in more detail a structure of the described server computer 400 of FIG. 1 according to a second embodiment of the present invention.

As shown in FIG. 10, a data communication part 410*a* transfers to the portable communication device 230*a* equipped in the surveillance vehicle 200, through the communication network 300, the information on vehicles in various questions such as theft, search, and so on, which is periodically inputted from the computers 500 of the processing institutions such as police, junked vehicle management agencies, district offices, and the like, for controlling and managing vehicles, and receives information on the subject vehicle 100 verified as a vehicle in question from the portable communication device 230*a* equipped in the surveillance vehicle 200 through the communication network 300.

The main control part 420*a* controls the storage into the database 430*a* of the information on vehicles in various questions such as theft, search, and so on, which is periodically inputted from the computers 500 of the processing institutions such as police, junked vehicle management agencies, district offices, and the like which control and manage vehicles, through the data communication part 410*a*, simultaneously controls transfers to the portable communication device 230*a* equipped in the surveillance vehicle 200 through the communication network 300, and controls the storage into the database 430*a* of the information on the subject vehicle 100 verified as a vehicle in question received from the portable communication device 230*a* equipped in the surveillance vehicle 200 through the data communication part 410*a*.

The database 430 updates and stores information on vehicles in various questions such as theft, search, and so on, inputted from the processing institution computers 500 according to the main control part 420, and stores the information of the subject vehicle 100 verified as a vehicle in question which is received from the portable communication device 230*a* equipped in the surveillance vehicle 200.

Next, a method for automatically recognizing a license plate number of a subject vehicle in use of a surveillance vehicle will be described in detail according to the second embodiment of the present invention constructed as above with reference to FIG. 11.

Figure 11A:
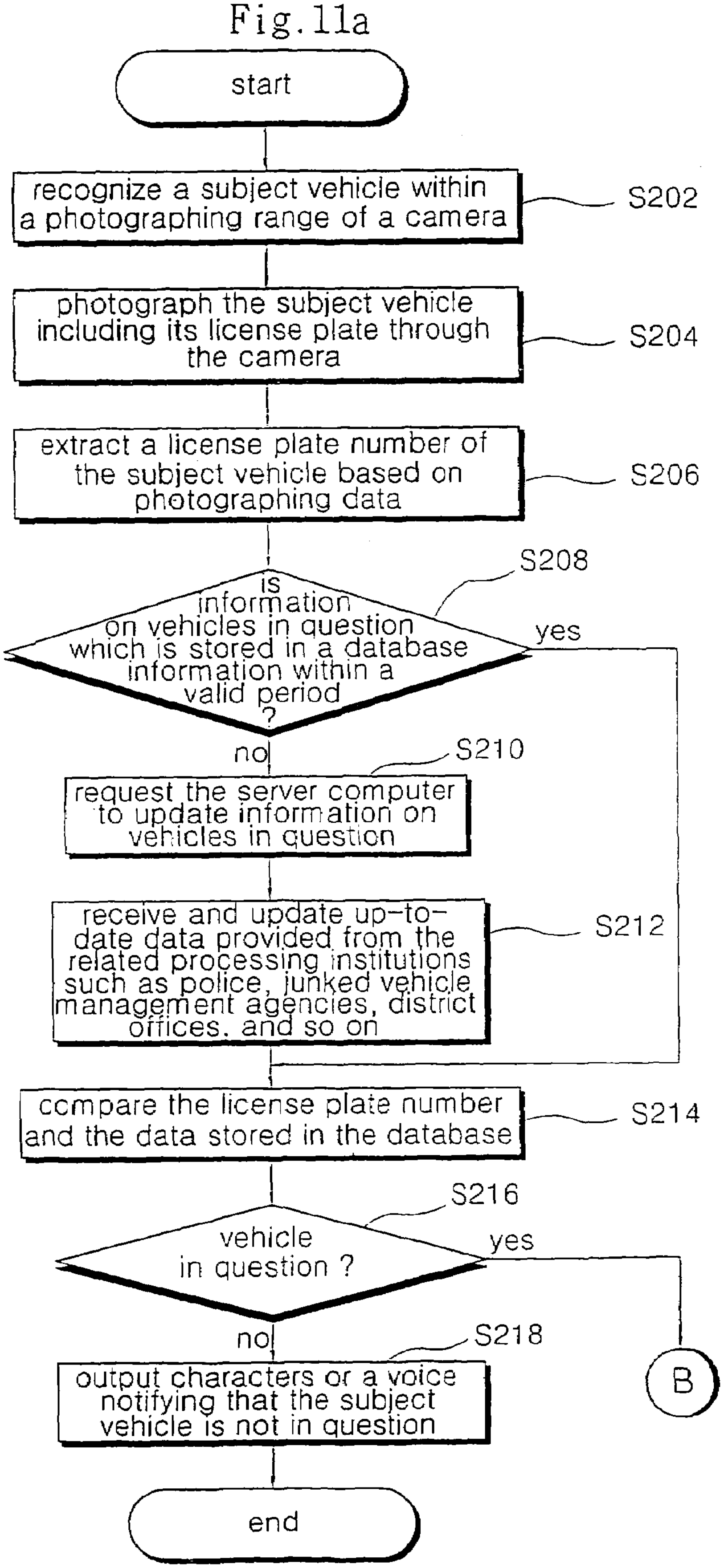
FIG. 11 is a flow chart for showing a method for automatically recognizing a license plate number of a subject vehicle in use of a surveillance vehicle according to the second embodiment of the present invention.
Figure 11B:
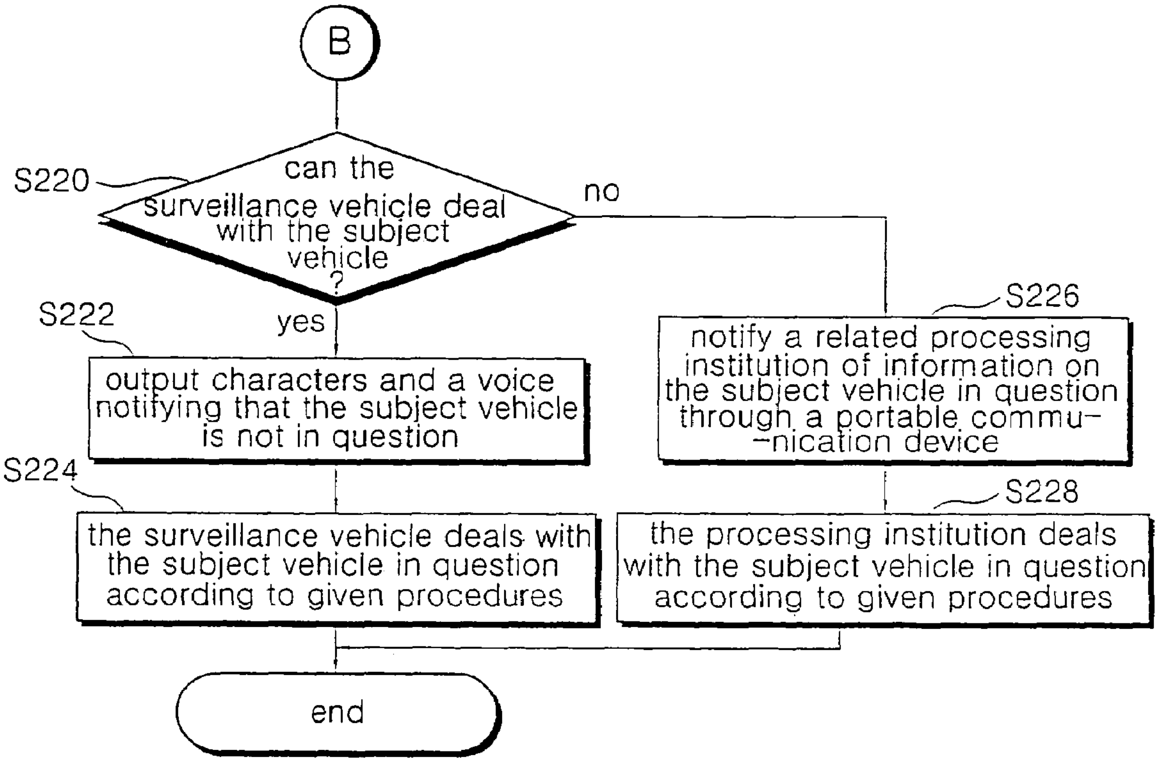

FIG. 11 is a flow chart for showing a method for automatically recognizing a license plate number of a subject vehicle in use of a surveillance vehicle according to the second embodiment of the present invention.

First, the second embodiment of the present invention is a method that extracts a license plate number of the subject vehicle 100 from the surveillance vehicle 200, verifies whether the subject vehicle 100 has a problem in comparison of the extracted license plate number with the database inside the surveillance vehicle 200, directly notifies a driver or a passenger of the information on the subject vehicle 100 in question according to whether the surveillance vehicle 200 can deal with it or notifies the related processing institution computers 500 for processing, which recognizes the subject vehicle 100 on the run or in parking/stopping which is located within a photographing range from the particular surveillance vehicle 200 equipped with an automatic license plate number recognition device (camera, surveillance device, portable communication device, and so on)(S202), and photographs the subject vehicle 100 inclusive of its license plate number information through the camera 210*a* equipped in the surveillance vehicle 200 (S204).

At this time, the photographing of the subject vehicle 100 is done by the camera 210*a* after automatically recognizing the subject vehicle 100 by means of a surveillance sensor provided at a certain position of the surveillance vehicle 200 or the camera 210*a*, or by a method that a driver or a passenger recognizes the s subject vehicle 100, manipulates the camera 210*a*, and photographs the subject vehicle 100.

After acquiring photographing data inclusive of the information on the license plate number of the subject vehicle 100 through the camera 210*a*, the control part 223*a* of the surveillance part 220*a* equipped in the surveillance vehicle 200 outputs to the license plate number recognition part 224*a* the photographing data inputted through the photographing data input part 222*a* for an extraction of the license plate number of the subject vehicle 100 (S206). At this time, a detailed description for the license plate number extraction based on the photographing data of the subject vehicle 100 which is carried out in the license plate number recognition part 224*a* will be omitted in here since it is the same as the license plate number extraction process described in the first embodiment.

After extracting a license plate number of the subject vehicle 100 through the above step S206, the surveillance part 220*a* determines whether information on vehicles in question stored in the database 225*a* provided inside the surveillance part 220*a* is up-to-date information within a valid period (S208).

If the information on vehicles in question stored in the database 225*a* are not up-to-date information within a valid period as a result of the determination, the control part 223*a* of the surveillance part 220*a* requests to the server computer 400, through the portable communication device 230*a* connected to a communication interface 228*a*, up-to-date information on vehicles in various questions which is provided from the computers 500 of related processing institutions such as police), junked vehicle management agencies, district offices, and so on (S210), receives the up-to-date information on vehicles in various questions from the server computer 400, and updates the database 225*a* (S212).

If the information on vehicles in question stored in the database 225*a* is up-to-date information within a valid period as a result of the determination of the above step S208 or after updating to up-to-date information through the above steps S210 and S212, the surveillance part 220*a* compares the license plate number of the subject vehicle 100 extracted through the above step S206 with the information on vehicles in question stored in the database 225*a* (S214), and determines whether the subject vehicle 100 is one in question as a result of the comparison (S216).

If the subject vehicle 100 is not one in question as a result of the determination, the surveillance part 220*a* outputs through a display part 226*a* or a voice output part 227*a* in characters or by voice a message notifying that the subject vehicle 100 is not one in question (S120).

However, if the subject vehicle 100 is one in question as a result of the determination of the above step S216, the surveillance part 220*a* determines whether the surveillance vehicle 200 can deal with the subject vehicle 100 (S220). That is, this is to check whether the surveillance vehicle 200 has a judicial processing capacity (for example, police vehicle).

If the surveillance vehicle 200 can directly deal with the subject vehicle 100 in question as a result of the determination, the surveillance part 220*a* outputs through the display part 226*a*or the voice output part 227*a* in characters or by voice a message notifying that the subject vehicle 100 is one in question (S222), and enables the surveillance vehicle 200 to deal with the subject vehicle 100 in question based on given processing procedures (S224).

However, as a result of the determination in the above step S220, if the surveillance vehicle 200 can not directly deal with the subject vehicle 100 in question since it has no judicial processing capacity, the surveillance part 220*a* transfers the information of the subject vehicle 100 in question to the related processing institutions computers 500 through the portable communication device 230*a* connected to the communication interface 228*a* (S226), and enables a corresponding processing institution to deal with the subject vehicle 100 in question based on the information from the surveillance vehicle 200 (S228).

Lastly, the surveillance vehicle 200 or a vehicle of a related processing institution records photographing and processing results as to the particular subject vehicle 100, and, likewise, the server computer 400 records and manages inquiry and processing results of the subject vehicle 100 requested from the surveillance vehicle 200.

Embodiment 3

A basic structure of a system for automatically recognizing a license plate number according to a third embodiment of the present invention are the same as in reference numbers and names when compared with the structure of FIG. 1 described in the first embodiment before, but it has a difference in functions transferring to the server computer 400 all the photographing data of the subject vehicle 100 from the surveillance vehicle 200, extracting a license plate number of the subject vehicle 100 from the server computer 400 based on the photographing data, comparing the extracted license plate number with a database existing inside the server computer 400, and directly verifying whether the subject vehicle 100 is one in question.

That is, the surveillance vehicle 200 includes a camera 210*b* for is photographing license plate information of the subject vehicle 100 on the run or in parking or stopping, a surveillance part 220*b* for extracting a license plate number of the subject vehicle 100 based on the photographing data of the subject vehicle 100, receiving through a portable communication device 230*b* result data on whether the subject vehicle 100 has a problem from the server computer 400 verifying whether the subject vehicle 100 is one in question based on the extracted license plate number, and notifying a driver or a passenger in characters or by voice, and a portable communication device 230*b* for transferring the photographing data of the camera 210*b* to the server computer 400 through the communication network 300

At this time, in the third embodiment of the present invention as described above, in addition to a method for photographing the license plate information of the subject vehicle 100 on the run or in parking or stopping through the camera 210*b* equipped in the surveillance vehicle 200 in a fixed manner, a method can be used in which a driver, passenger, or a movable (portable) camera bearer of the surveillance vehicle 200 photographs license plate information of the subject vehicle 100 on the run or in parking or stopping, connects the movable (portable) camera to the surveillance part 220*b* for downloading the photographing data, and transfers to the server computer 400 the photographing data inclusive of the downloaded license plate information of the subject vehicle 100 through the portable communication device 230*b* connected to the surveillance part 220*b*.

The server computer 400 is periodically provided through the communication network 300 with information on vehicles in various questions such as theft or search, for building a database, from the computers 500 of processing institutions such as police, junked vehicle management agencies, district offices, and so on, which control and manage vehicles, extracts a license plate number of the subject vehicle 100 based on the photographing data received from the surveillance vehicle 200 through the communication network 300, verifies whether the subject vehicle 100 is one in question in comparison of the extracted license plate number of the subject vehicle 100 with the information on vehicles in question stored in the database, and transfers to the portable communication device 230*b* equipped in the corresponding surveillance vehicle 200 the result data as to whether the subject vehicle 100 has a problem.

At this time, the server computer 400 described above extracts a license plate number of the subject vehicle 100 based on the photographing data of the subject vehicle 100 received from the portable communication device 230*b* equipped in the particular surveillance vehicle 200, determines whether the surveillance vehicle 200 can deal with the subject vehicle 100 if the subject vehicle 100 is one in question when verifying whether to be in question in comparison with the information on vehicles in various questions such as theft and/or search stored in the database, and, if the corresponding surveillance vehicle 200 can not deal with the subject vehicle 100 verified as a vehicle in question, transfers the information (license plate number of the subject vehicle, present position, and so on) of the subject vehicle 100 verified as a vehicle in question, for processing, to the computers 500 of the processing institutions such as police, junked vehicle management agencies, district offices, and the like.

Figure 12:
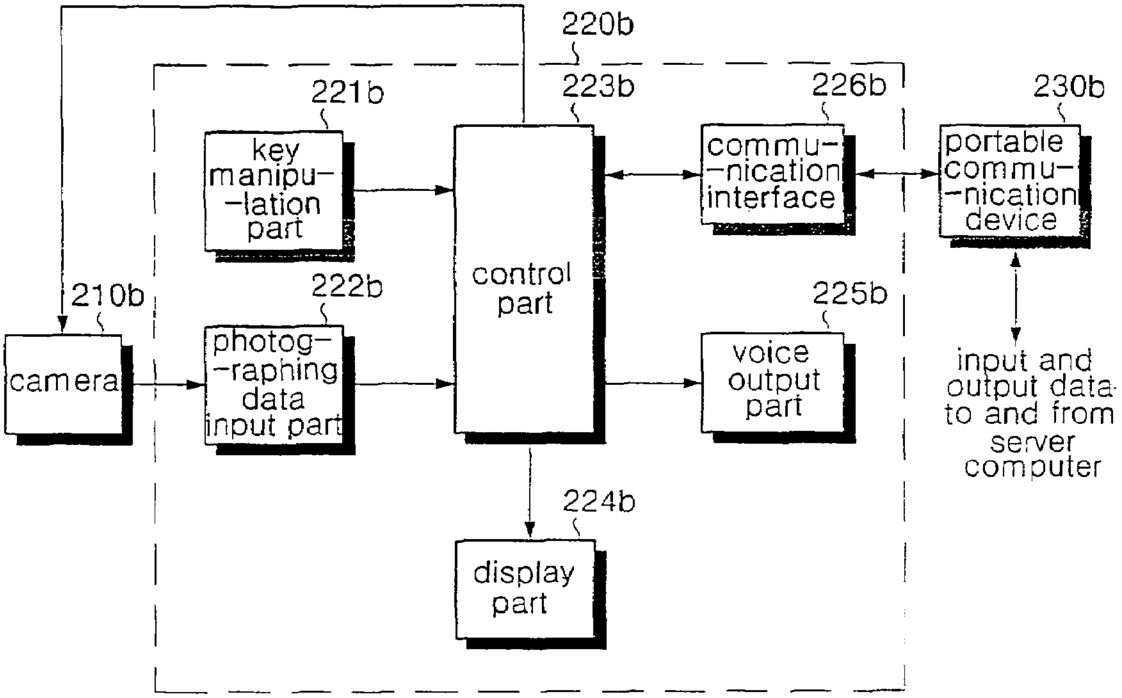
FIG. 12 and FIG. 13 are views for showing in detail internal structures of a surveillance vehicle and a server computer according to a third embodiment of the present invention.

FIG. 12 is a view for showing in more detail the internal structure of the described surveillance vehicle 200 of FIG. 1 according to the third embodiment of the present invention.

As shown in FIG. 12, a key manipulation part 221*b* inputs, for a recognition of a license plate number of the subject vehicle 100, a key manipulation signal of a driver or a passenger of the surveillance vehicle 200 for an output to a control part 223*b*.

A photographing data input part 222*b* inputs photographing data of the subject vehicle 100 photographed through the camera 210*b* for an output to the control part 223*b*.

The control part 223*b* controls to the server computer 400 through the portable communication device 230*b* an transfer of the photographing data of the subject vehicle 100 inputted through the photographing data input part 222*b*, and controls character and voice outputs, for driver's or passenger's identifications, of the result data on whether the subject vehicle 100 received from the server computer 400 has a question.

A display part 224*b* displays on a screen result data as to whether the subject vehicle 100 received from the server computer 400 through the portable communication device 230*b* has a problem according to the controls of the control part 223*b* to enable a driver or a passenger to verify it.

A voice output part 225*b* converts into a voice result data on whether the subject vehicle 100 received from the server computer 400 through the portable communication device 230*b* is one in question according to the controls of the control part 223*b*, and outputs the voice though speakers for driver's or passenger's verifications.

A communication interface 226*b* is connected, for communications, with the portable communication device 230*b* equipped in the surveillance vehicle 200, outputs to the portable communication device 230*b* the photographing data of the subject vehicle 100 photographed according to the control of the control part 223*b*, and outputs to the control part 223*b* the result data as to whether the subject vehicle 100 inputted from the server computer 400 through the portable communication device 230*b* has a problem.

Figure 13:
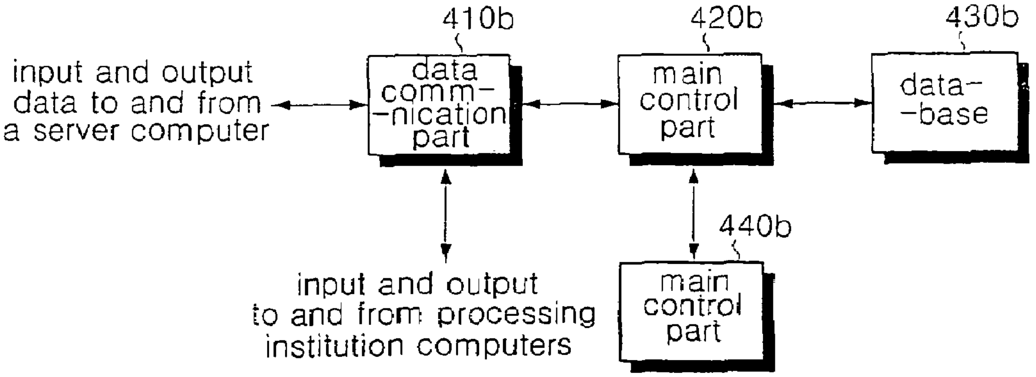

FIG. 13 is a view for showing in more detail a structure of the described server computer 400 of FIG. 1 according to the third embodiment of the present invention.

As shown in FIG. 13, a data communication part 410*b* periodically inputs through the communication network 300 the information on vehicles in various questions such as theft, search, and so on, from the computers 500 of the processing institutions such as police, junked vehicle management agencies, district offices, and the like, receives through the communication network 300 the photographing data of the subject vehicle 100 photographed by the camera 210*b* from the portable communication device 230*b* equipped in the surveillance vehicle 200, and transfers the result data as to whether the subject vehicle 100 inputted from a main control part 420*b* has a problem to the portable communication device 230*b* equipped in the corresponding surveillance vehicle 200.

The main control part 420*b* controls into the database 430*b* the storage of the information on vehicles in various questions such as theft, search, and so on, which is inputted from the computers 500 of the processing institutions such as police, junked vehicle management agencies, district offices, and the like which control and manage vehicles, through the data communication part 410*b*, controls extractions of a license plate number of the subject vehicle 100 based on the photographing data of the subject vehicle 100 received from the surveillance vehicle 200 through the data communication part 410*b*, verifies whether the subject vehicle 100 is one in question in comparison of the license plate number of the corresponding subject vehicle 100 with the information on vehicles stored in the database 430*b* based on the extracted license plate number of the subject vehicle 100, and controls the transfer of the result data on whether the subject vehicle 100 has a problem to the portable communication device 230*b*.

The database 430*b* updates and stores information on vehicles in various questions such as theft, search, and so on, inputted from the respective processing institution computers 500 according to the controls of the main control part 420*b*.

A license plate number recognition part 440*b* extracts a license plate number of the surveillance vehicle 100 based on the photographing data of the subject vehicle 100 received from the surveillance vehicle 200 through the data communication part 410*b* according to the control of the main control part 420*b*.

Next, a method for automatically recognizing a license plate number of a subject vehicle in use of a surveillance vehicle according to the third embodiment of the present invention constructed as above with reference to FIG. 13.

Figure 14A:
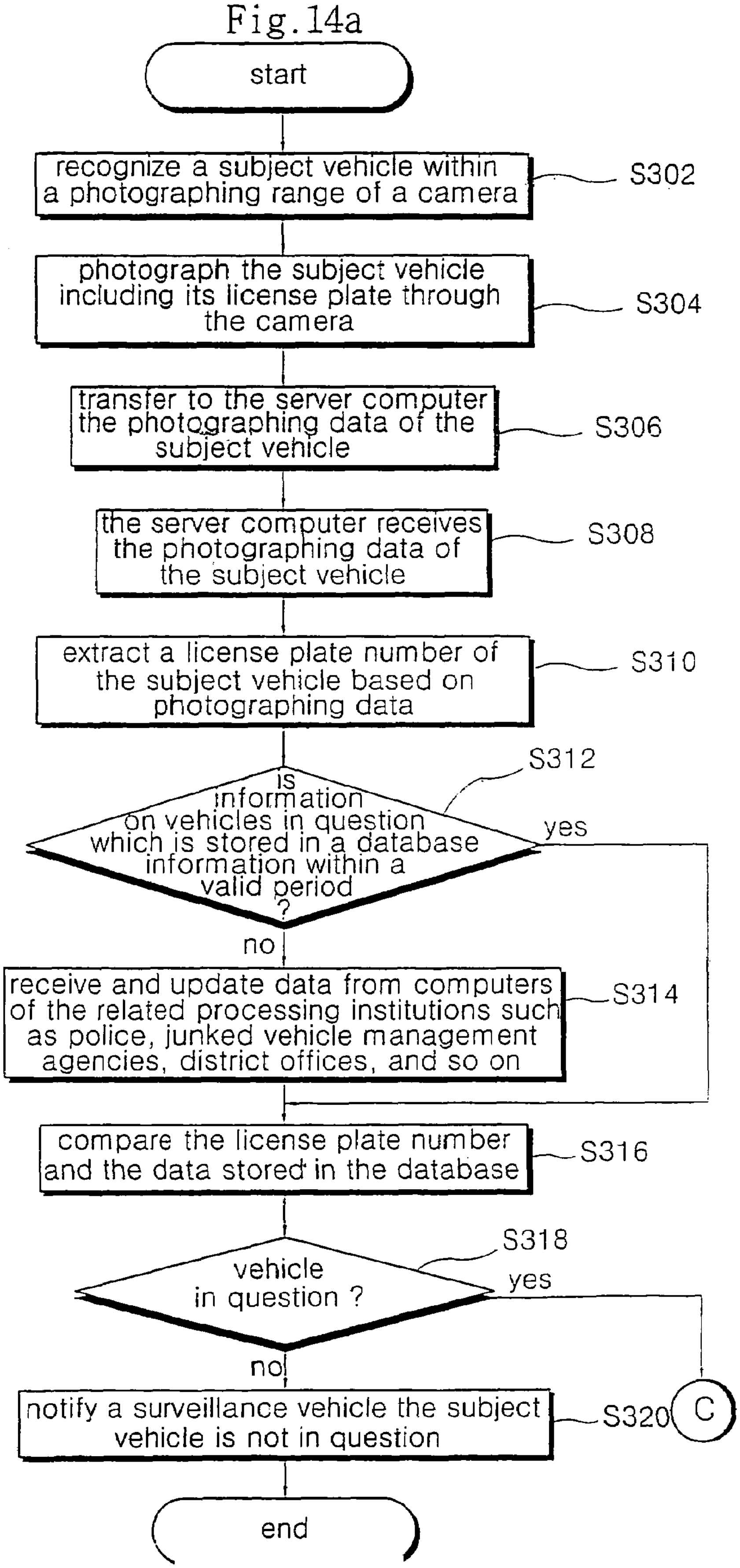
FIG. 14 is a flow chart for a method for automatically recognizing a license plate number of a subject vehicle in use of a surveillance vehicle according to the third embodiment of the present invention.
Figure 14B:
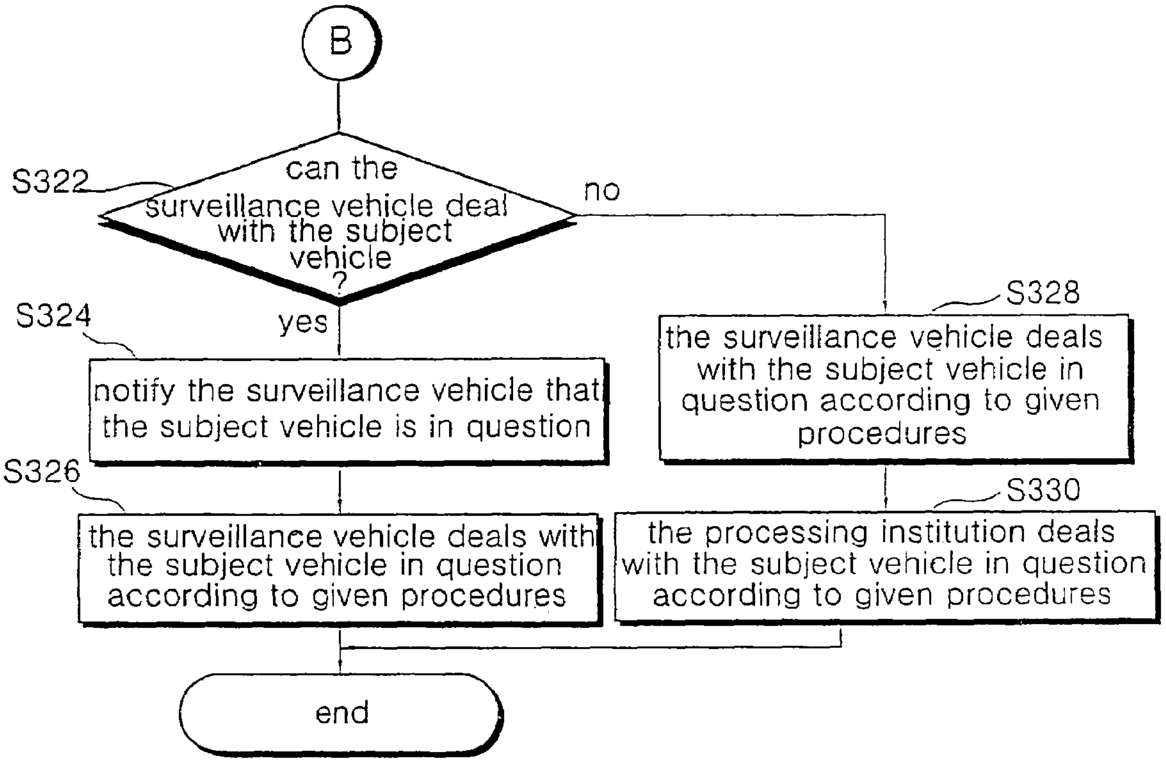

FIG. 14 is a flow chart for showing a method for automatically recognizing a license plate number of a subject vehicle in use of a surveillance vehicle according to the third embodiment of the present invention.

First, the third embodiment of the present invention is a method in which the server computer 400 extracts a license plate number of the subject vehicle 100 based on the photographing data of the subject vehicle 100 received from the surveillance vehicle 200, verifies whether the subject vehicle 100 has a problem, and notifies the surveillance vehicle 200 or the related processing Institution computers 500, for processing, of information on the subject vehicle 100 in question according to whether the corresponding surveillance vehicle 200 can deal with the subject vehicle 100, the particular surveillance vehicle 200 equipped with an automatic license plate number recognition device (camera, surveillance device, portable communication device, and so on) recognizes the subject vehicle 100 on is the run or in parking or stopping which is located within a photographing range (S302), and photographs the subject vehicle 100 inclusive of information on its license plate through the camera 210*b* equipped in the surveillance vehicle 200 (S304).

At this time, the photographing of the subject vehicle 100 is done by the camera 210*b* after automatically recognizing the subject vehicle 100 by means of a surveillance sensor provided at a certain position of the surveillance vehicle 200 or the camera 210*b*, or by a method that a driver or a passenger recognizes the subject vehicle 100, manipulates the camera 210*b*, and photographs the subject vehicle 100.

After acquiring photographing data inclusive of the information on the license plate of the subject vehicle 100 through the camera 210*b*, the surveillance part 220*b* of the surveillance vehicle 200 transfers the photographing data of the corresponding subject vehicle 100 to the server computer 400 through the portable communication device 230*b* connected to the communication interface 226*b* (S306).

The server computer 400 receives the photographing data of the subject vehicle 100 from the surveillance vehicle 200 through the communication network 200 (S308).

Further, the main control part 420*b* of the server computer 400 outputs to the license plate number recognition part 440*b* the photographing data of the subject vehicle 100 received from the surveillance vehicle 200 through the data communication part 410*b* for an extraction of the license plate number of the subject vehicle 100 (S310). In here, a detailed description on the extraction of the license plate number based on the photographing data of the subject vehicle 100 which is carried out by the license plate number recognition part 440*b* will be omitted since it is the same as the license plate number extraction previously described in the first embodiment.

After the license plate number recognition part 440*b* extracts a license plate number based on the photographing data of the subject vehicle 100, the main control part 420*b* determines whether information on vehicles in question stored in the database 430*b* is up-to-date information within a valid period (S312).

If the information on vehicles in question stored in the database 430*b* are not up-to-date information within a valid period as a result of the determination, the main control part 420*b* proceeds for a communication connection to the computers 500 of related processing institutions such as police, junked vehicle management agencies, district offices, and so on, via the data communication part 410*b*, receives up-to-date information, and updates the database 430*b* (S314).

If the information on vehicles in question stored in the database 430*b* is up-to-date information within a valid period as a result of the determination of the above step S312, or after updating to up-to-date information through the above steps S314, the main control part 420*b* compares the license plate number of the subject vehicle 100 extracted through the above step S310 with the information on vehicles in question stored in the database 430*b* (S316), and determines whether the subject vehicle 100 is one in question as a result of the comparison (S318).

If the subject vehicle 100 has no problem as a result of the determination, the main control part 420*b* transfers to the corresponding surveillance vehicle 200 via the data communication part 410*b* a message notifying that the subject vehicle 100 is not one in question (S320).

At this time, in case that a driver or a passenger of the surveillance vehicle 200 is aware of having requested a vehicle inquiry to the server computer 400, the surveillance part 220*b* of the surveillance vehicle 200 notifies that the subject vehicle 100 has no problem through the display part 224*b* or the voice output part 225*b* to enable the driver or the passenger to verify it, and, in case that a driver or a passenger of the surveillance vehicle 200 is not aware of having requested a vehicle inquiry, the surveillance part 220*b* of the surveillance vehicle 200 records a receipt of a message that the subject vehicle 100 has no problem from the server computer 400.

However, if the subject vehicle 100 is one in question as a result of the determination of the above step S318, the main control part 420*b* determines whether the surveillance vehicle 200 can deal with the subject vehicle 100 (S322). That is, this is to check whether the surveillance vehicle 200 has a judicial processing capacity (for example, police vehicle).

If the surveillance vehicle 200 can directly deal with the subject vehicle 100 in question as a result of the determination, the main control part 420*b* transfers to the surveillance vehicle 200 a message notifying that the subject vehicle 100 is one in question (S324) to enables the surveillance vehicle 200 to deal with the subject vehicle 100 in question based on given processing procedures (S326).

However, as a result of the determination in the above step S322, if the surveillance vehicle 200 can not directly deal with the subject vehicle 100 in question since it has no judicial processing capacity, the main control part 420*b* notifies related processing institution computers 500 of the information of the subject vehicle 100 in question (S328) to enable a corresponding processing institution to deal with the subject vehicle 100 in question based on the information from the surveillance vehicle 200 (S330).

Lastly, the surveillance vehicle 200 or a vehicle of a related processing institution records photographing and processing results as to the particular subject vehicle 100, and, likewise, the server computer 400 records and manages inquiry and processing results of the subject vehicle 100 requested from the surveillance vehicle 200.

In the meantime, in the third embodiment of the present invention, in addition to a method for photographing the license plate information of the subject vehicle 100 in use of the camera 210*b* equipped in the surveillance vehicle 200 in a fixed manner through the above step S304, a method can be used in which a driver, passenger, or a movable (portable) camera bearer of the surveillance vehicle 200 photographs license plate information of the subject vehicle 100 on the run or in parking or stopping, connects the movable (portable) camera to the surveillance part 220*b* for downloading the photographing data, and transfers to the server computer 400 the photographing data inclusive of the downloaded license plate information of the subject vehicle 100 through the portable communication device 230*b* connected to the surveillance part 220*b*.

INDUSTRIAL APPLICABILITY

As stated above, the present invention has an effect on reductions of costs to be invested to vehicles in theft and in search by monitoring other vehicles through a surveillance vehicle and obtaining information thereof as well as has an effect on crime preventions by grasping whether other vehicles which are the subject vehicles are in question on the run, rather than a method of police inspection questioning and raid.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A system for automatically recognizing a license plate number of a subject vehicle in use of a surveillance vehicle, the subject vehicle being on the run or in parking or stopping, comprising:

the surveillance vehicle having a camera for photographing license plate information of the subject vehicle on the run or in parking or stopping, a surveillance part for extracting a license plate number of the subject vehicle based on data photographed through the camera, receiving result data on whether the subject vehicle is one in a question from a server computer verifying whether the subject vehicle has a problem based on the extracted license plate number of the subject vehicle for notifications to a driver or a passenger in characters or by voice, and a portable communication device for transferring the license plate number of the subject vehicle extracted from the surveillance part through a communication network; and the server computer for periodically receiving information on vehicles in the questions from computers of processing institutions that control and manage vehicles through the communication network for building a database, and, if the license plate number of the subject vehicle is received from the portable communication device equipped in the surveillance vehicle via the communication network, comparing the license plate number of the subject vehicle with the vehicle information stored in the database for identifications on whether the subject vehicle is in the question, and transferring result data on whether the subject vehicle has a problem to the portable communication device equipped in a corresponding surveillance vehicle, wherein the surveillance part equipped in the surveillance vehicle includes:

a key manipulation part for inputting a key manipulation signal of a driver or a passenger of the surveillance vehicle to recognize the license plate number of the subject vehicle;

a photographing data input part for inputting the photographing data of the subject vehicle photographed via the camera;

a control part for controlling an extractions of the license plate number of the subject vehicle based on the photographing data of the subject vehicle inputted through the photographing data input part, controlling an transfer of the extracted license plate number of the subject vehicle to the server computer through the portable communication device, and controls outputs of result data on whether the subject vehicle is in question which is received from the server computer verifying whether to be one in question based on the license plate number of the subject vehicle for driver's or passenger's identifications;

a vehicle license plate number recognition part for extracting the license plate number of the subject vehicle based on the photographing data of the subject vehicle inputted through the photographing data input part according to the control of the control part;

a database for storing various programs necessary for operations of the surveillance part and an automatic vehicle license plate number recognition program for extracting the license plate number of the subject vehicle based on the photographing data of the subject vehicle photographed by the camera;

a display part for displaying result data on whether the subject vehicle is one in question which is received from the server computer through the portable communication device according to the control of the control part;

a voice output part for converting the result data on whether the subject vehicle is in question which is received from the server computer through the portable communication device according to the control of the control part for an output through speakers; and a communication interface connected to the portable communication device equipped in the surveillance vehicle for communications, outputs the license plate number of the subject vehicle according to the control of the control part to the portable communication device, and outputs to the control part the result data on which the subject vehicle is in question which is inputted from the server computer through the portable communication device.

2. The system as claimed in claim 1, wherein the server computer includes:

a data communication part for periodically inputting information on vehicles in the questions from the computers of the processing institutions, receiving the license plate number of the subject vehicle from the portable communication device equipped in the surveillance vehicle through the communication network, and transferring the result data on whether the subject vehicle is in question which is inputted from a main control part to the portable communication device equipped in a corresponding surveillance vehicle;

the main control part for controlling the building of a database for information on vehicles in the question, which is inputted from the computers of the processing institutions, comparing the license plate number of the subject vehicle with the vehicle information stored in the database based on the license plate number of the subject vehicle received from the portable communication device equipped in the surveillance vehicle through the data communication part for identifications on whether the subject vehicle is in question, and controlling a transfer of the result data on whether the subject vehicle is in question to the portable communication device equipped in a corresponding surveillance vehicle; and a database for storing and updating the information on vehicles in various questions such as theft or search which is inputted from the computers of the processing computers according to the control of the main control part.

3. The system as claimed in claim 1 or claim 2, wherein the server computer determines whether a corresponding surveillance vehicle can deal with the subject vehicle if the subject vehicle is in question when verifying whether the subject vehicle has a problem in comparison of the information on vehicles in various question such as theft or search stored in the database based on the license plate number of the subject vehicle which is received from the portable communication device equipped in a particular surveillance vehicle, and transfers, for processing, the information on the subject vehicle(license plate number of the subject vehicle, present location, and the like) verified as a vehicle in question to the computers of the processing institution if the corresponding surveillance vehicle can not deal with the subject vehicle verified as a vehicle in question.

4. A system for automatically recognizing a license plate number of a subject vehicle in use of a surveillance vehicle, the subject vehicle being on the run or in parking or stopping, comprising:

the surveillance vehicle having:

a camera for photographing license plate information of the subject vehicle on the run or in parking or stopping, a surveillance part for extracting the license plate number of the subject vehicle based on data photographed via the camera, comparing the extracted license plate number of the subject vehicle with information on vehicles in the question which is stored in a database for verifications on whether the subject vehicle is in question, notifying a driver or a passenger in characters or by voice of result data on whether the subject vehicle is in question, and recording discovery of a vehicle in question if impossible to notify a server computer of notification of a result on whether the subject vehicle is in question, and a portable communication device for receiving information on vehicles in question which is periodically updated from the server computer and transferring to the server computer through the communication network information on the subject vehicle verified as a vehicle in question if possible to notify the server computer of a result as to whether the subject vehicle is in question; and the server computer for periodically receiving information on vehicles in the question from computers of processing institutions that control and manage vehicles through the communication network for building a database, transferring the information on vehicles in question which is periodically updated to the portable communication device equipped in each surveillance vehicle through the communication network, and storing in the database the information on the subject vehicle verified as a vehicle in the question which is received from the portable communication device equipped in the surveillance vehicle through the communication network, wherein the surveillance part equipped in the surveillance vehicle includes:

a key manipulation part for inputting a key manipulation of a driver or a passenger of the surveillance vehicle for recognition of the license plate number of the subject vehicle;

a photographing data input part for inputting photographing data of the subject vehicle which is photographed through the camera;

a control part for controlling the storage of information on vehicles in various question such as theft and search which is periodically received from the server computer, controlling the extraction of the license plate number of the subject vehicle based on the photographing data of the subject vehicle which is inputted through the photographing data input part, comparing the extracted license plate number of the subject vehicle with the information on vehicles in question stored in the database for verifying whether the subject vehicle is in question, controlling outputs of result data on whether the subject vehicle is in question in characters or by voice for driver's or passenger's verifications, and storing in the database discovery of a vehicle in question if impossible to notify the server computer of a result as to whether the subject vehicle is in question;

a license plate number recognition part for extracting the license plate number of the subject vehicle based on the photographing data of the subject vehicle which is inputted through the photographing data input part according to the control of the control part;

the database for storing various programs necessary for operations of the surveillance part and an automatic license plate number recognition program for extracting the license plate number of the subject vehicle based on the photographing data of the subject vehicle which is photographed by the camera, storing and updating the information on vehicles in various questions such as theft and search which is periodically received from the server computer, and storing the discovery of a vehicle in question according to the control of the control part;

a display part for displaying the result data as to whether the subject vehicle is in question according to the control of the control part;

a voice output part for converting into voice the result data as to whether the subject vehicle is in question according to the control of the control part for an output through speakers; and a communication interface connected for communications to the portable communication device equipped in the surveillance vehicle, and for outputting to the control part the information on vehicles in various questions such as theft and search which is periodically received from the server computer through the portable communication device, and outputting to the portable communication device the information on the subject vehicle verified as a vehicle in question according to the control of the control part.

5. The system as claimed in claim 4, wherein the server computer includes:

a data communication part for transferring to the portable communication device equipped in the surveillance vehicle through the communication network the information on vehicles in the question which in periodically inputted from the computer of the processing institutions, and receiving information on subject vehicle verified as a vehicle in question from the portable communication device equipped in the surveillance vehicle through the communication network;

a main control part for controlling the building of the database for the information on vehicles in the question such as theft and search which is periodically inputted from the computers of the processing institutions and simultaneously controlling an transfer of the information to the portable communication device equipped in the surveillance vehicle through the communication network, and controlling into the database the storage of the information of the subject vehicle verified as a vehicle in the question which is received from the portable communication device equipped in the surveillance vehicle through the data communication part; and the database for storing and updating the information on vehicles in various questions such as theft and search which is inputted from the processing institution computers according to the control of the main control part, and for storing the information on the subject vehicle verified as a vehicle in the question which is received from the portable communication device equipped in the surveillance vehicle.

6. The system as claimed in claim 4, wherein the surveillance part equipped in the surveillance vehicle determines whether a corresponding surveillance vehicle can deal with the subject vehicle if the subject vehicle is verified as a vehicle in question when verifying whether the subject vehicle is one in the question in comparison with the information on vehicles in the question which is stored in the database based on the license plate number of the subject vehicle which is extracted via the photographing of the camera, and, if the corresponding surveillance vehicle can not deal with the subject vehicle verified as a vehicle in question, transfers, for processing, the information on the subject vehicle verified as a vehicle in question to the computers of the processing institutions via the portable communication device connected to the surveillance part based on the data stored in the database.

7. A system for automatically recognizing a license plate number of a subject vehicle in use of a surveillance vehicle, the subject vehicle being on the run or in parking or stopping, comprising:

the surveillance vehicle including:

a camera for photographing license plate information of the subject vehicle on the run or in parking or stopping, a surveillance part for extracting the license plate number based on photographing data of the subject vehicle, and notifying a driver or a passenger in characters or by voice of result data on whether the subject vehicle is in the question which is received through a portable communication device from a server computer verifying whether the subject vehicle is one in question based on the extracted license plate number, and the portable communication device for transferring the photographing data of the camera through a communication network to the server computer; and the server computer for building a database for the information on vehicles in the question which is periodically provided from computers of processing institutions that control and manage vehicles through the communication network, extracting the license plate number of the subject vehicle based on the photographing data received from the surveillance vehicle through the communication network, verifying whether the subject vehicle is in question in comparison of the extracted license plate number of the subject vehicle with the information on vehicles in question which is stored in the database, and transferring result data as to whether the subject vehicle is in the question to the portable communication device equipped in the surveillance vehicle for a surveillance vehicle driver's or a passenger's verifications, wherein the surveillance part equipped in the surveillance vehicle includes:

a key manipulation part for inputting a key manipulation signal of a driver or a passenger of the surveillance vehicle for recognition of the license plate number of the subject vehicle;

a photographing data input part for inputting the photographing data of the subject vehicle photographed via the camera;

a control part for controlling character and/or voice outputs of the result data on whether the subject vehicle is in question which is received from the server computer for a driver's or a passenger's verifications;

a display part for display the result data on whether the subject vehicle is in question which is received from the server computer through the portable communication device according to the control of the control part;

a voice output part for converting into voice the result data on whether the subject vehicle is one in question which is received from the server computer through the portable communication device according to the control of the control part for outputs through speakers; and a communication interface connected for communications to the portable communication device equipped in the surveillance vehicle, and for outputting to the portable communication device the photographing data of the subject vehicle photographed by the camera according to the control of the control part, and outputting to the control part the result data as to whether the subject vehicle is in question which is inputted from the server computer through the portable communication device.

8. The system as claimed in claim 7, wherein the server computer includes:

a data communication part for periodically inputting through the communication network the information on vehicles in various questions such as theft and search from the computers of the processing institutions, receiving through the communication network the photographing data of the subject vehicle photographed by the camera from the portable communication device equipped in the surveillance vehicle, and transferring the result data as to whether the subject vehicle is one in the question which is inputted from a main control part to the portable communication device equipped in a corresponding surveillance vehicle;

the main control part for controlling the building of the database for the information on vehicles in various questions such as theft and search which is inputted through the data communication part from the computers of the processing institutions, controlling the extraction of the license plate number of the subject vehicle based on the photographing data of the subject vehicle which is received through the data communication part from the surveillance vehicle, verifying whether the subject vehicle is in the question in comparison of the license plate number of the corresponding subject vehicle with the information on vehicles which is stored in the database based on the extracted license plate number of the subject vehicle, and controlling an transfer of the result data as to whether the subject vehicle is one in question to the portable communication device equipped in the corresponding surveillance vehicle;

the database for storing and updating the information on vehicles in various questions such as theft and search which in inputted from the processing institution computers according to the control of the main control part; and a license plate number recognition part for extracting the license plate number of the subject vehicle based on the photographing data of the subject vehicle which is received from the surveillance vehicle through the data communication part according to the control of the main control part.

9. The system as claimed in claim 7 or claim 8, wherein the server computer extracts the license plate number of the subject vehicle based on the photographing data of the subject vehicle which is received from the portable communication device equipped in the surveillance vehicle, determines whether the corresponding surveillance vehicle can deal with the subject vehicle if the subject vehicle is in question when verifying whether the subject vehicle has a problem in comparison of the information on vehicles in various question such as theft or search stored in the database, and transfers, for processing, the information on the subject vehicle verified as a vehicle in question to the computers of the processing institutions if the corresponding surveillance vehicle can not deal with the subject vehicle verified as a vehicle in question.

10. The system as claimed in claim 7, wherein the surveillance part equipped in the surveillance vehicle transfers, if the photographing data inclusive of the license plate information of the subject vehicle on the run or in parking or stopping which is photographed through manipulations of a driver or a passenger or through a movable(portable) camera bearer of the surveillance vehicle is downloaded, to the server computer through the communication network the photographing data of the corresponding subject vehicle which is downloaded.

11. A method for automatically recognizing a license plate number of a subject vehicle in use of a surveillance vehicle, which is applied to an automatic license plate number recognition system, comprising steps of:

(1) recognizing the subject vehicle on the run or in parking or stopping which is located in a photographing range of a camera mounted to the surveillance vehicle, and photographing the subject vehicle inclusive of its license plate through the camera;

(2) extracting the license plate number of the subject vehicle based on photographing data of the subject vehicle photographed by the camera;

(3) transferring through a portable communication device to a server computer the license plate number of the subject vehicle which is extracted in the surveillance part equipped in the surveillance vehicle;

(4) inputting, if the server computer receives the license plate number of the subject vehicle from the surveillance vehicle, up-to-date information on vehicles in question from related processing institution computers based on whether a database provided for grasping whether the subject vehicle is in the question is valid, and updating the database;

(5) verifying by the server computer whether the subject vehicle has a problem in comparison with the information on vehicles in the question stored in the database based on the license plate number of the subject vehicle which is received from the surveillance vehicle;

(6) notifying, by the server computer, the surveillance vehicle that the subject vehicle is not one in question, if it is verified that the subject vehicle is not one in the question;

(7) determining, by the server computer, whether the surveillance vehicle can deal with the subject vehicle if it is verified that the subject vehicle is one in the question (8) notifying, by the server computer, the surveillance vehicle that the subject vehicle is one in question to deal with the subject vehicle in the question, if the surveillance vehicle can deal with the subject vehicle in the question; and (9) notifying, by the server computer, a related processing institution computer of the information on the subject vehicle to deal with the subject vehicle, if the surveillance vehicle can not deal with the subject vehicle in the question, wherein the step (2) includes steps of:

(2-1) extracting a license plate region of the subject vehicle based on the photographing data inclusive of the license plate number of the subject vehicle photogaraphed by the camera;

(2-2) extracting individual character regions from the extracted license plate region;

(2-3) extracting characteristic vectors from the respective individual character regions extracted; and (2-4) recognizing characters and numbers from the characteristic vectors extracted from the respective individual character regions to identify the license plate number of the subject vehicle.

12. The method as claimed in claim 11, wherein the step (2-1) includes steps of:

(2-1-1) acquiring an image for the extraction of the license plate region from the photographing data inclusive of the license plate information of the subject vehicle photographed by the camera;

(2-1-2) down-sampling the image acquired from the step (2-1-1) to lower a resolution thereof for alleviation of an image deterioration by camera movements;

(2-1-3) configuring an image pyramid having a different spatial resolution from the down-sampled image for a resolution selection suitable for the extraction of the license plate region;

(2-1-4) converting, after the configuration of the image pyramid having a different spatial resolution, a color level into a gray level in use of color information of the license plate, and then converting into a binary image through a suitable threshold value selection, producing a projection image in lengthwise and widthwise directions, and performing clustering to extract a rectangular region in use of the lengthwise and widthwise projection image and an aspect ratio of length and width of the license plate;

(2-1-5) determining whether a position and a size of the license plate in the clustering-performed image are correct and proceeding with the next step (2-2); and (2-1-6) producing left, right, up, and down position information of the camera and a zoom control signal, if the position and size of the license plate region in the clustering-performed image are not correct, and controlling the camera by a control part of a surveillance part equipped in the surveillance vehicle.

13. The method as claimed in claim 11, wherein the step (2-2) includes steps of:

(2-2-1) converting into a gray level the license plate region extracted through the step (2-1);

(2-2-2) applying a horizontal histogram to the license plate region converted into the gray level for separation into upper and lower portions;

(2-2-3) applying a vertical histogram to the license plate region separated into the upper and lower portions according to the horizontal histogram application to extract individual characters existing in the license plate region; and (2-2-4) digitizing through a proper threshold value selection the individual characters extracted through the horizontal and vertical histogram applications of the steps (2-2-2) and (2-2-3) and proceeding with the next step (2-3).

14. The method as claimed in claim 11, wherein the step (2-3) includes steps of:

(2-3-1) dividing in a vertical direction each individual character of the license plate region extracted through the step (2-2);

(2-3-2) dividing each individual character in a horizontal direction after the division of each individual character of the license plate region in the vertical direction;

(2-3-3) performing a 64-dimensional(8×8) mapping after dividing respective individual characters of the license plate region in the horizontal and vertical directions; and (2-3-4) normalizing values of the mapped respective individual characters, after the 64-dimensional(8×8) mapping, to extract characteristic vectors.

15. The method for automatically recognizing a license plate number of a subject vehicle in use of a surveillance vehicle, which is applied to an automatic license plate number recognition system, comprising steps of:

(A) recognizing the subject vehicle on the run or in parking or stopping which is located within a photographing range of a camera mounted to the surveillance vehicle, and photographing the subject vehicle inclusive of a license plate thereof through the camera;

(B) extracting a license plate number of the subject vehicle based on photographing data of the subject vehicle photographed by the camera;

(C) receiving up-to-date information on vehicles in question which is provided to a related processing institution computer from a server computer, after the extraction of the license plate number of the subject vehicle, according to whether a database provided for grasping whether the subject vehicle is in question is valid, and updating the database;

(D) comparing the information on vehicles in question which is stored in the database based on the license plate number of the subject vehicle extracted from a surveillance part equipped in a surveillance vehicle and verifying whether the subject vehicle has a problem;

(E) outputting characters or a voice, if the subject vehicle is not one in question, notifying from the surveillance part equipped in the surveillance vehicle that the subject vehicle is not one in question for driver's or passenger's identifications;

(F) determining whether the surveillance part equipped in the surveillance vehicle can deal with the subject vehicle if the subject vehicle is one in question;

(G) outputting characters or a voice, if the surveillance vehicle can deal with the subject vehicle in question, notifying from the surveillance part equipped in the surveillance vehicle that the subject vehicle is one in question to enable a driver or a passenger to deal with the subject vehicle in question; and (H) notifying the related processing institution computer from the surveillance part equipped in the surveillance vehicle of information on the subject vehicle through a portable communication device, if the surveillance vehicle can not deal with the subject vehicle in question, to enable dealing with the subject vehicle in question wherein the step (B) includes steps of:

(B-1) extracting the license plate region of the subject vehicle based on the photographing data inclusive of the license plate information of the subject vehicle photographed by the camera;

(B-2) extracting the individual character regions from the extracted license plate region;

(B-3) extracting characteristic vectors from the extracted respective individual character regions; and (B-4) recognizing characters and numbers from the characteristic vectors extracted from the respective individual character regions to identify the license plate number of the subject vehicle.

16. The method as claimed in claim 15, wherein the step (B-1) includes steps of:

(B-1-1) acquiring an image for extracting the license plate region from the photographing data inclusive of the license plate information of the subject vehicle photographed by the camera;

(B-1-2) down-sampling the image acquired from the step (B-1-1) to lower a resolution thereof for alleviation of an image deterioration by movements of the camera;

(B-1-3) configuring an image pyramid having a different spatial resolution from the down-sampled image for a selection of a resolution suitable for the extraction of the license plate region;

(B-1-4) converting a color level into a gray level in use of color information of the license plate, after configuring the image pyramid having a different spatial resolution, and then converting into a binary image through a proper threshold value selection, producing a projection image in lengthwise and widthwise directions, and performing clustering to extract a rectangular region in use of the lengthwise/widthwise projection image and an aspect ratio of length and width of the license plate;

(B-1-5) determining whether a position and a size of the license plate region in the clustering-performed image are correct, and proceeding with the next step (B-2); and (B-1-6) producing left, right, up, and down position information of the camera and a zoom control signal, if the position and size of the license plate region in the clustering-performed image are not correct, and controlling the camera by a control part of a surveillance part equipped in the surveillance vehicle.

17. The method as claimed in claim 15, wherein the step (B-2) includes steps of:

(B-2-1) converting into a gray level the license plate region extracted through the step (B-1);

(B-2-2) applying a horizontal histogram to the license plate region converted into the gray level for separation into upper and lower portions;

(B-2-3) applying a vertical histogram to the license plate region separated into the upper and lower portions according to the horizontal histogram application to extract individual characters existing in the license plate region; and (B-2-4) digitizing through a proper threshold value selection the individual characters extracted through the horizontal and vertical histogram applications of the steps (B-2-2) and (B-2-3) and proceeding with the next step (B-3).

18. The method as claimed in claim 15, wherein the step (B-3) includes steps of:

(B-3-1) dividing in a vertical direction each individual character of the license plate region extracted through the step (B-2);

(B-3-2) dividing each individual character in a horizontal direction after the division of each individual character of the license plate region in the vertical direction;

(B-3-3) performing a 64-dimensional(8×8) mapping after dividing respective individual characters of the license plate region in the horizontal and vertical directions; and (B-3-4) normalizing values of the mapped respective individual characters, after the 64-dimensional(8×8) mapping, to extract characteristic vectors.

19. The method for automatically recognizing a license plate number of a subject vehicle in use of a surveillance vehicle, which is applied to an automatic license plate number recognition system, comprising steps of:

(a) recognizing the subject vehicle on the run or in parking or stopping which is located within a photographing range of a camera mounted to the surveillance vehicle, and photographing the subject vehicle inclusive of a license plate thereof through the camera;

(b) transferring through the communication network to a server computer photographing data of the subject vehicle photographed by the camera;

(c) extracting a license plate number of the subject vehicle based on the photographing data if the server computer receives the photographing data of the subject vehicle from the surveillance vehicle;

(d) receiving, by the server computer, up-to-date information on vehicles in question from a related processing institution computer according to whether a database provided for grasping whether the subject vehicle is in question is valid, and updating the database;

(e) comparing, by the server computer, the information on vehicles in question which is stored in the database based on the license plate number of the subject vehicle and verifying whether the subject vehicle has a problem;

(f) notifying, by the server computer, the surveillance vehicle that the subject vehicle is not one in question, if the subject vehicle is not one in question;

(g) determining,by the server computer, whether the surveillance vehicle can deal with the subject vehicle if the subject vehicle is one in question;

(h) notifying, by the server computer, the surveillance vehicle that the subject vehicle is one in question, to enable the dealing with the subject vehicle in question, if the surveillance vehicle can deal with the subject vehicle in question; and (i) notifying, by the server computer, the related processing institution computer of information on the subject vehicle, if the surveillance vehicle can not deal with the subject vehicle in question, to enable the dealing with the subject vehicle in question, wherein the step (c) includes steos of:

(c-1) extracting a license olate reaion of the subject vehicle based on the photograghing data inclusive of license plate information of the subject vehicle photographed by the camera;

(c-2) extracting individual character regions from the extracted license plate region;

(c-3) extracting characteristic vectors from the extracted respective individual character regions; and (c-4) recognizing characters and numbers from the characteristic vectors extracted from the respective individual character regions to identify the license plate number of the subject vehicle.

20. The method as claimed in claim 19, wherein the step (c-1) includes steps of:

(c-1-1) acquiring an image for extracting the license plate region from the photographing data inclusive of the license plate information of the subject vehicle photographed by the camera;

(c-1-2) down-sampling the image acquired from the step (c-1-1) to lower a resolution thereof for alleviation of an image deterioration by movements of the camera;

(c-1-3) configuring an image pyramid having a different spatial resolution from the down-sampled image for a selection of a resolution suitable for the extraction of the license plate region;

(c-1-4) converting a color level into a gray level in use of color information of the license plate, after configuring the image pyramid having a different spatial resolution, and then converting into a binary image through a proper threshold value selection, producing a projection image in lengthwise and widthwise directions, and performing clustering to extract a rectangular region in use of the lengthwise/widthwise projection image and an aspect ratio of length and width of the license plate;

(c-1-5) determining whether a position and a size of the license plate region in the clustering-performed image are correct, and proceeding with the next step (c-2); and (c-1-6) producing left, right, up, and down position information of the camera and a zoom control signal, if the position and size of the license plate region in the clustering-performed image are not correct, and controlling the camera by a control part of a surveillance part equipped in the surveillance vehicle.

21. The method as claimed in claim 19, wherein the step (c-2) includes steps of:

(c-2-1) converting into a gray level the license plate region extracted through the step (c-1);

(c-2-2) applying a horizontal histogram to the license plate region converted into the gray level for separation into upper and lower portions;

(c-2-3) applying a vertical histogram to the license plate region separated into the upper and lower portions according to the horizontal histogram application to extract individual characters existing in the license plate region; and (c-2-4) digitizing through a proper threshold value selection the individual characters extracted through the horizontal and vertical histogram applications of the steps (c-2-2) and (c-2-3) and proceeding with the next step (c-3).

22. The method as claimed in claim 19, wherein the step (c-3) includes steps of:

(c-3-1) dividing in a vertical direction each individual character of the license plate region extracted through the step (c-2);

(c-3-2) dividing each individual character in a horizontal direction after the division of each individual character of the license plate region in the vertical direction;

(c-3-3) performing a 64-dimensional(8×8) mapping after dividing respective individual characters of the license plate region in the horizontal and vertical directions; and (c-3-4) normalizing values of the mapped respective individual characters, after the 64-dimensional(8×8) mapping, to extract characteristic vectors.

* * * * *